United States Patent
Li et al.

(10) Patent No.: US 10,338,743 B2
(45) Date of Patent: Jul. 2, 2019

(54) METHOD AND APPARATUS FOR PREVENTING ACCIDENTAL TOUCH OPERATION ON MOBILE TERMINALS

(71) Applicant: NUBIA TECHNOLOGY CO., LTD, Shenzhen (CN)

(72) Inventors: Xin Li, Shenzhen (CN); Shian Shen, Shenzhen (CN); Hanfei Ou, Shenzhen (CN)

(73) Assignee: NUBIA TECHNOLOGY CO., LTD., Shenzhen (CN)

( * ) Notice: Subject to any disclaimer, the term of this patent is extended or adjusted under 35 U.S.C. 154(b) by 160 days.

(21) Appl. No.: 15/547,492

(22) PCT Filed: Jan. 25, 2016

(86) PCT No.: PCT/CN2016/071955
§ 371 (c)(1),
(2) Date: Jul. 29, 2017

(87) PCT Pub. No.: WO2016/119649
PCT Pub. Date: Aug. 4, 2016

(65) Prior Publication Data
US 2018/0024692 A1    Jan. 25, 2018

(30) Foreign Application Priority Data

Jan. 30, 2015 (CN) .......................... 2015 1 0054799

(51) Int. Cl.
*G06F 3/041* (2006.01)
*G06F 3/0488* (2013.01)

(52) U.S. Cl.
CPC .......... *G06F 3/0418* (2013.01); *G06F 3/0416* (2013.01); *G06F 3/0488* (2013.01)

(58) Field of Classification Search
CPC ..... G06F 3/0416; G06F 3/0418; G06F 3/0488
(Continued)

(56) References Cited

U.S. PATENT DOCUMENTS

2013/0088429 A1   4/2013   Yang
2014/0300559 A1*  10/2014  Tanimoto .............. G06F 3/0416
                                                              345/173
(Continued)

FOREIGN PATENT DOCUMENTS

CN       102279667 A    12/2011
CN       102830844 A    12/2012
(Continued)

OTHER PUBLICATIONS

The World Intellectual Property Organization (WIPO) International Search Report for PCT/CN2016/071955 dated Apr. 12, 2016 5 Pages.

*Primary Examiner* — Calvin C Ma
(74) *Attorney, Agent, or Firm* — Anova Law Group, PLLC

(57) ABSTRACT

The present disclosure provides an accidental-touch prevention method and apparatus for a mobile terminal. The method includes: receiving by the touch screen IC layer a touch instruction from a user, and reporting a touch point on a touch track corresponding to the touch instruction to the driver layer; determining by the driver layer whether the touch point is in the chamfered-rounded-angle area; and when the touch point is in the chamfered-rounded-angle area, correcting coordinates of the touch point by the driver layer.

18 Claims, 13 Drawing Sheets

(58) Field of Classification Search
USPC .................................. 345/156–158, 173–174
See application file for complete search history.

(56) References Cited

U.S. PATENT DOCUMENTS

2014/0351768 A1* 11/2014 Park ...................... G06F 3/0488
715/856
2014/0375582 A1* 12/2014 Park ...................... G06F 3/0414
345/173

FOREIGN PATENT DOCUMENTS

| CN | 103455266 A | 12/2013 |
| CN | 104020878 A | 9/2014 |
| CN | 104714692 A | 6/2015 |

* cited by examiner

METHOD AND APPARATUS FOR PREVENTING ACCIDENTAL TOUCH OPERATION ON MOBILE TERMINALS

CROSS-REFERENCE TO RELATED APPLICATIONS

This application is a national phase entry under 35 U.S.C. § 371 of International Application No. PCT/CN2016/071955, filed on Jan. 25, 2016, which claims priority to and benefits of Chinese Patent Application Serial No. 201510054799.7, filed with the State Intellectual Property Office of P. R. China on Jan. 30, 2015, the entire content of all of which is incorporated herein by reference.

FIELD OF THE DISCLOSURE

The present disclosure generally relates to the field of touch control technology and, more particularly, relates to a method and apparatus for preventing accidental touch operation on mobile terminals.

BACKGROUND

At present, in the design of mobile terminal, in order to protect touch panel and LCD panel, a glass will be fit upon the touch panel and LCD panel. As the need of design, some of the glass is designed to be with chamfered-rounded-angle edge. During the use of the user, it is often found that the action point on the display screen of the mobile terminal (the point displayed on the screen) is not the point the user operates, that is, there is a problem that the touch point in the chamfered-rounded-angle area of the edge of the glass screen on mobile terminal does not correspond to the action point (the point displayed on the screen).

BRIEF SUMMARY OF THE DISCLOSURE

Embodiments of the present disclosure provide an accidental-touch prevention method and apparatus for a mobile terminal, so as to improve the accidental-touch prevention effect of the mobile terminal and to improve the design flexibility of the accidental-touch-prevention-area function of mobile terminals.

An accidental-touch prevention method for a mobile terminal is provided, wherein the mobile terminal includes a touch control unit comprising: an application layer, a driver layer and a touch screen IC layer, the driver layer has an interface for the application layer to call, the touch screen has a chamfered-rounded-angle area, the mobile terminal accidental-touch prevention method comprising:

receiving, by the touch screen IC layer, a touch instruction from a user, and reporting a touch point on a touch track corresponding to the touch instruction to the driver layer;

determining, by the driver layer, whether the touch point is in the chamfered-rounded-angle area; and when the touch point is in the chamfered-rounded-angle area, correcting, by the driver layer, coordinates of the touch point.

Optionally, correcting, by the driver layer, coordinates of the touch point further comprises:

receiving, by the driver layer, the horizontal coordinate of the touch point reported by the touch screen IC layer, and acquiring the length of the arc of the chamfered-rounded-angle in the X-axis direction;

based on a pre-set offset index, the horizontal coordinate of the touch point, and the length of the arc of the chamfered-rounded-angle in the X-axis direction, calculating the actual horizontal coordinate of the touch point.

Optionally, the method further comprises:

reporting, by the driver layer, to the application layer the touch point with the corrected coordinates.

Optionally, after determining, by the driver layer, whether the touch point falls within a chamfered-rounded-angle area, further comprising:

when the touch point is not in the chamfered-rounded-angle area, reporting, by the driver layer, the coordinate of the touch point to the application layer.

Optionally, the chamfered-rounded-angle area is located on the left side, the right side, the upper edge, or the lower edge of the touch screen, or the whole edge, or a combination of any of the above.

Optionally, the method further comprises:

analyzing a pre-set number of reported touch points, determining the pre-set offset index.

Optionally, analyzing a pre-set number of reported touch points, determining the pre-set offset index comprises:

calculating the pre-set offset index using the following formula:

$$X\_fact + \text{Offset} = X\_report;$$

$$\text{Offset} = (W1 - X\_fact) * I;$$

wherein X_fact is the actual horizontal coordinate of the touch point; X_report is the coordinate reported by the touch screen IC layer; Offset is the offset value; I is the pre-set offset index; W1 is the length of the arc of the chamfered-rounded-angle in the X-axis direction.

Optionally, the method further comprises:

receiving, by the application layer, an accidental-touch-prevention-area configuration instruction, the accidental-touch-prevention-area configuration instruction includes coordinate parameters of the accidental-touch prevention area;

based on the accidental-touch-prevention-area configuration instruction, calling, by the application layer, the interface of the driver layer to set up the one or more accidental-touch prevention areas on the touch screen of the mobile terminal.

Optionally, the method further comprises:

receiving, by the touch screen IC layer, a touch instruction from a user, and reporting the touch point information corresponding to the touch instruction to the driver layer;

determining, by the driver layer, whether the touch point according to the touch point information falls within the accidental-touch prevention area; performing, by the driver layer, accidental-touch prevention processing on the touch point when the touch point according to the touch point information falls within the accidental-touch prevention area; otherwise, reporting, by the driver layer, the touch point information to the application layer, and responding, by the application layer, to the touch point.

Optionally, determining, by the driver layer, whether the touch point according to the touch point information falls within the accidental-touch prevention area; performing, by the driver layer, accidental-touch prevention processing on the touch point when the touch point according to the touch point information falls within the accidental-touch prevention area, further comprising:

determining, by the driver layer, whether a start point of the touch track falls within the pre-set accidental-touch prevention area, and performing accidental-touch prevention process according to the determining result.

An accidental-touch-prevention apparatus for a mobile terminal is provided, wherein the mobile terminal includes a touch control unit comprising: an application layer, a driver layer and a touch screen IC layer, the driver layer has an interface for the application layer to call, the touch screen has a chamfered-rounded-angle area, the accidental-touch-prevention apparatus for the mobile terminal with the touch screen comprising:

an instruction receiving module configured to receive a touch instruction from a user by the touch screen IC layer, and to report a touch point on a touch track corresponding to the touch instruction to the driver layer; and a processing module configured to determine whether the touch point is in the chamfered-rounded-angle area by the driver layer; and when the touch point is in the chamfered-rounded-angle area, correct coordinates of the touch point by the driver layer.

Optionally, the processing module is configured to:

receive the horizontal coordinate of the touch point by the driver layer reported by the touch screen IC layer, and acquire the length of the arc of the chamfered-rounded-angle in the X-axis direction; based on a pre-set offset index, the horizontal coordinate of the touch point, and the length of the arc of the chamfered-rounded-angle in the X-axis direction, calculate the actual horizontal coordinate of the touch point.

Optionally, the processing module is configured to:

report to the application layer the touch point with the corrected coordinates by the driver layer.

Optionally, the processing module is configured to:

when the touch point is not in the chamfered-rounded-angle area, report the coordinate of the touch point by the driver layer to the application layer.

Optionally, the chamfered-rounded-angle area is located on the left side, the right side, the upper edge, or the lower edge of the touch screen, or the whole edge, or a combination of any of the above.

Optionally, the processing module is configured to:

analyze a pre-set number of reported touch points, determine the pre-set offset index.

Optionally, the processing module configured to:

calculate the pre-set offset index using the following formula:

$$X\_fact + \text{Offset} = X\_report;$$

$$\text{Offset} = (W1 - X\_fact) * I;$$

wherein X_fact is the actual horizontal coordinate of the touch point; X_report is the coordinate reported by the touch screen IC layer; Offset is the offset value; I is the pre-set offset index; W1 is the length of the arc of the chamfered-rounded-angle in the X-axis direction.

Optionally, the instruction receiving module configured to receive an accidental-touch-prevention-area configuration instruction by the application layer, the accidental-touch-prevention-area configuration instruction includes coordinate parameters of the accidental-touch prevention area;

the processing module configured to call the interface of the driver layer by the application layer to set up the one or more accidental-touch prevention areas on the touch screen of the mobile terminal based on the accidental-touch-prevention-area configuration instruction.

Optionally, the instruction receiving module configured to receive a touch instruction from a user by the touch screen IC layer, and report the touch point information corresponding to the touch instruction to the driver layer;

the processing module configured to determine whether the touch point according to the touch point information falls within the accidental-touch prevention area by the driver layer; perform accidental-touch prevention processing by the driver layer on the touch point when the touch point according to the touch point information falls within the accidental-touch prevention area; otherwise, report the touch point information by the driver layer to the application layer, and respond to the touch point by the application layer.

Optionally, the processing module configured to:

determine whether a start point of the touch track falls within the pre-set accidental-touch prevention area by the driver layer, and perform accidental-touch prevention process according to the determining result.

The present disclosure provides an accidental-touch prevention method and apparatus for a mobile terminal, a touch instruction from a user is received by the touch screen IC layer, a touch point corresponding to the touch instruction is reported to the driver layer, and the driver layer determines whether the touch point is within a chamfered-rounded-angle area. When the touch point is within the chamfered-rounded-angle, coordinates of the touch point are corrected by the driver layer, so as to achieve accurately positioning the touch point, solving the problem that the touch point on the chamfered-rounded-angle of glass screen on the mobile terminal does not correspond to the action point (the point displayed on the screen). The accidental-touch prevention effect for the mobile terminal can be improved, and a better touch screen experience can be provided for the terminal users.

DETAILED DESCRIPTION

Figure 1:
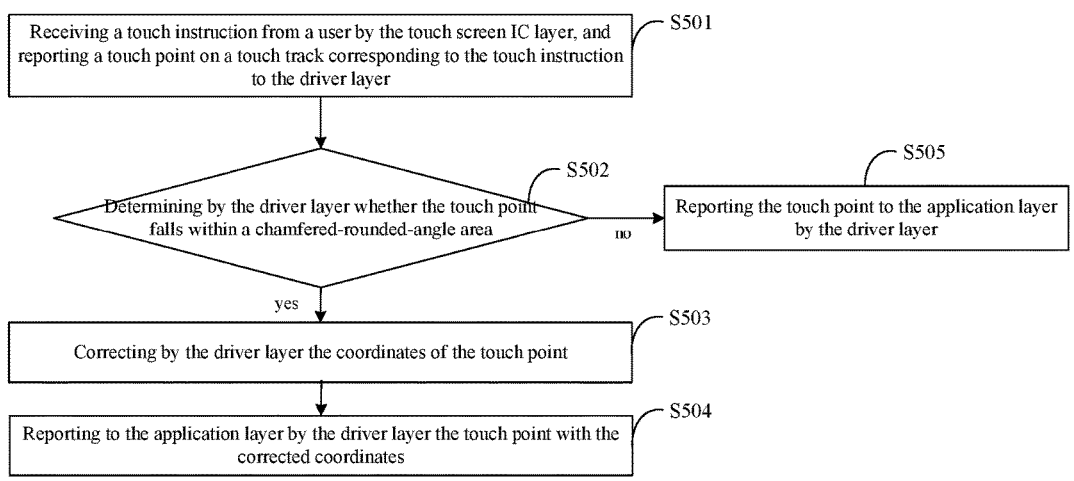
FIG. 1 is a flowchart of an accidental-touch prevention method for mobile terminals according to a first embodiment of the present disclosure.

The following is a detailed description of certain preferred embodiments of the present disclosure together with the accompanying drawings. It should be understood that the specific embodiments described herein are only used to explain the present disclosure and are not intended to limit the present disclosure.

In embodiments of the present disclosure of accidental-touch prevention area designs for mobile terminals with narrow frame or frameless touch screens, a touch instruction from a user is received by the touch screen IC layer, a touch point corresponding to the touch instruction is reported to the driver layer, and the driver layer determines whether the touch point is within a chamfered-rounded-angle area. When the touch point is within the chamfered-rounded-angle, coordinates of the touch point are corrected by the driver layer, so as to achieve accurately positioning the touch point, solving the problem that the touch point on the chamfered-rounded-angle of glass screen on the mobile terminal does not correspond to the action point (the point displayed on the screen). The accidental-touch prevention effect for the mobile terminal can be improved, and a better touch screen experience can be provided for the terminal users.

It should be noted that, with the development of mobile phones and other mobile terminals, manufacturers and users increasingly pursue narrow frames on mobile terminals, or even go frameless. Although a narrow frame or frameless can bring user a shock effect visually, it also introduces a problem: when a user holds such a mobile phone, it is very easy to accidentally touch the edge of the screen of the mobile phone, causing accidental touch operations and lowering the user experience. To solve this problem, touch screen IC manufacturers design the accidental-touch prevention area. However, the functionality of the accidental-touch prevention area designed by current touch screen IC manufacturers are implemented in the IC firmware. Once set, the number, position, and size of the area cannot be changed and, thus, the software design of such mobile terminal cannot break through the restriction from the touch screen IC manufacturers. The size means the area of the accidental-touch prevention area.

In addition, most of the existing touch screen gestures are achieved by sliding (such as a single finger slide for a page-flipping action), and the current accidental-touch prevention algorithm may filter out the track line with the start point in the accidental-touch prevention area. If the start point of a touch gesture is in the accidental-touch prevention area, the touch gesture can be filtered out, which causes accidental of the touch gesture and lowers the user experience. Further, with the current technologies, there exist the problem that the touch point on the chamfered-rounded-angle of glass screen on the mobile terminal does not correspond to the action point (the point displayed on the screen), the accidental-touch prevention effect for the mobile terminal is further lowered.

Based on the above considerations, embodiments of the present disclosure provide following solutions.

The mobile terminal according to the embodiments of the present disclosure may be a touch control mobile terminal, such as a mobile phone or a tablet computer, which is mainly designed for the accidental-touch prevention area in a frameless or narrow frame mobile terminal.

A frameless terminal may use the following structure.

The frameless terminal includes a middle frame having a storage space, a display screen provided in the middle frame, and a transparent cover plate provided above the display screen. The edge of the transparent cover plate is a chamfer, and the chamfer refracts the light emitted from the backlight module, such that the light emitted out of the chamfer and widen the display area. Further, the middle frame is chamfered in the direction of the chamfer and, therefore, when looking from the front vertical direction of the transparent cover plate, the extension direction of the entire transparent cover plate can all be visible area. That is, the display range of the display screen is extended to the edge of the display screen of the mobile terminal, thus realizing the effect of frameless display and also making the side of the touch control mobile terminal having sensing area.

The embodiments of the present disclosure use the frameless terminal for example, but do not intend to limit to the present disclosure.

The present disclosure provides an accidental-touch prevention method for a mobile terminal. The touch control software architecture of the mobile terminal includes an application layer, a driver layer, and a touch screen IC layer, the driver layer has an interface for the application layer to call. The present embodiment flexibly sets the accidental-touch prevention areas by using the code in the driver layer, and the driver layer has an interface for the application layer to call. The application layer calls the interface to have the driver layer realize the flexible configuration of the number, location, size of the accidental-touch prevention areas.

By setting the accidental-touch prevention areas, when the touch screen IC layer receives the user's touch instruction, the touch instruction is reported to the driver layer, and the driver layer determines the touch instruction reported by the touch screen IC layer. The driver layer filters the touch points, performs the accidental-touch prevention processing on the touch point falling within the accidental-touch prevention area, i.e., not reporting to the application layer, and reports to the application layer the touch points falling outside of the accidental-touch prevention area. The application layer performs corresponding responding operations on the reported touch points.

The edges of the touch screen of the mobile terminal have a chamfered-rounded-angle area, the mobile terminal accidental-touch prevention method comprising:

receiving a touch instruction from a user by the touch screen IC layer, and reporting a touch point on a touch track corresponding to the touch instruction to the driver layer;

determining by the driver layer whether the touch point falls within a chamfered-rounded-angle area;

when the touch point is in the chamfered-rounded-angle area, correcting the coordinates of the touch point by the driver layer.

Optionally, correcting the coordinates of the touch point by the driver layer further comprises:

the driver layer receives the horizontal coordinate of the touch point reported by the touch screen IC layer, and acquires the length of the arc of the chamfered-rounded-angle in the X-axis direction; based on a pre-set offset index, the horizontal coordinate of the touch point, and the length of the arc of the chamfered-rounded-angle in the X-axis direction, calculating the actual horizontal coordinate of the touch point. It should be noted that, the X-axis direction in this embodiment is the direction correspond to the direction of the vertical projection of the extend of the arc in the corresponding horizontal plane. In general, the coordinates in this embodiment also correspond to vertical ordinates, wherein the vertical ordinates are the coordinates along the Y-axis direction. The Y-axis is vertical to the X-axis. The Y-axis direction can be considered to be the direction that the chamfered-rounded-angle area does not cause the coordinate of the touch point to incur an offset or the offset to in a pre-set controllable range.

Optionally, the method further comprising:

reporting to the application layer by the driver layer the touch point with the corrected coordinates.

Optionally, after determining by the driver layer whether the touch point falls within a chamfered-rounded-angle area, the method further comprising: when the touch point is not in the chamfered-rounded-angle area, the driver layer reports the coordinate of the touch point to the application layer.

In one embodiment, the chamfered-rounded-angle area can be located on the left side, the right side, the upper edge, or the lower edge of the touch screen, or the whole edge, or a combination of any of the above.

Optionally, referring to FIG. 1, an accidental-touch prevention method for mobile terminals according to a first embodiment of the present disclosure is provided, the mobile terminal accidental-touch prevention method further includes the followings:

Step S501, receiving a touch instruction from a user by the touch screen IC layer, and reporting a touch point on a touch track corresponding to the touch instruction to the driver layer.

Step S502, determining by the driver layer whether the touch point falls within a chamfered-rounded-angle area. If the touch point is in the chamfered-rounded-angle area, the method proceeds to Step S503 and, otherwise, proceeds to Step S505.

Step S503, correcting by the driver layer the coordinates of the touch point, and the method proceeds to Step S504.

Step S504, reporting to the application layer by the driver layer the touch point with the corrected coordinates.

Step S505, reporting the touch point to the application layer by the driver layer.

The above Step S504 and Step S505 can be implemented optionally.

Optionally, in the present embodiment, the edges of the touch screen of the mobile terminal have a chamfered-rounded-angle area, and the chamfered-rounded-angle area can be located on the left side, the right side, the upper edge, or the lower edge of the touch screen, or the whole edge, or a combination of any of the above.

The present embodiment is a solution to the problem that the touch point at the chamfered-rounded-angle area of the edge of the glass screen does not correspond to the action point (the point displayed on the screen).

The present disclosure corrects the coordinates of the touch point by the touch screen driver layer, makes the touch point in the chamfered-rounded-angle area of the glass screen correspond to the point displayed on the screen, and provides the user with better use experience of touch screens.

Optionally, firstly, the touch screen IC layer receives the user's touch instruction, and reports the touch point corresponding to the touch instruction to the driver layer.

Then, the driver layer determines whether the touch point falls within the chamfered-rounded-angle area. If the touch point falls within the chamfered-rounded-angle area, the driver layer corrects the coordinate of the touch point and then reports the corrected coordinate of the touch point. If the touch point is not in the chamfered-rounded-angle area, the driver layer reports the coordinate of the touch point directly.

Figure 2:
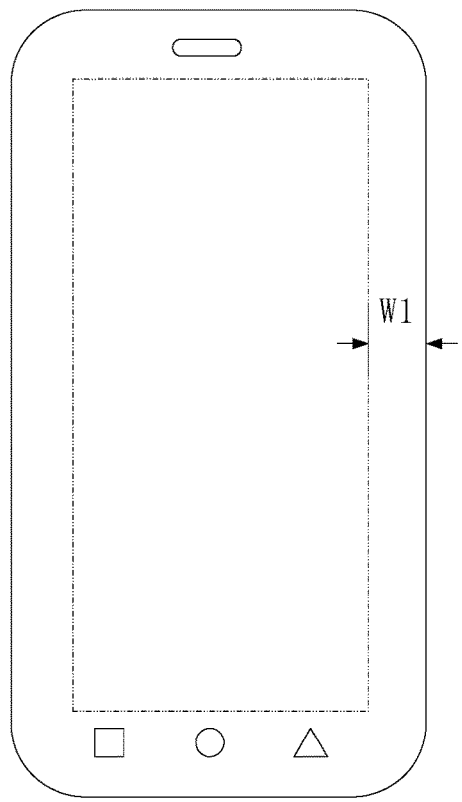
FIG. 2 is a schematic diagram of an interface on the terminal touch screen of a correction algorithm in the embodiment of FIG. 1.

The process of correcting the coordinate of the touch point by the driver layer includes the followings:

Referring to FIG. 2, the coordinate of the touch point in the chamfered-rounded-angle area of the glass screen (i.e., W1 in the FIG. 2) is corrected.

The correcting of the horizontal coordinate of the touch point is used as an example (the correcting of the vertical ordinate of the touch point is based on similar principle).

Firstly, the driver layer receives the horizontal coordinate of the touch point reported by the touch screen IC layer, and acquires the length of the arc of the chamfered-rounded-angle in the X-axis direction.

Based on a pre-set offset index, the horizontal coordinate of the touch point, and the length of the arc of the chamfered-rounded-angle in the X-axis direction, the actual horizontal coordinate of the touch point is calculated using a predetermined coordinate correction algorithm.

The correction algorithm of coordinate of the present embodiment is as follows:

$$X\_{\_fact} = \frac{X\_{\_report} - W1 * I}{1 - I};$$

The principle of the coordinate correction algorithm can be derived as follows:

Firstly, from the analysis of a large number of reported touch points, the following two formulas can be given:

$$X\_{\_fact} + \text{Offset} = X\_{\_report};$$

$$\text{Offset} = (W1 - X\_{\_fact}) * I;$$

Where X_fact is the actual horizontal coordinate of the touch point; X_report is the coordinate reported by the touch screen IC layer; Offset is the offset value; I is the pre-set offset index; W1 is the length of the arc of the chamfered-rounded-angle in the X-axis direction.

From the above two formulas, the correction formula can be reversely derived, as shown below:

$$X\_{\_fact} = \frac{X\_{\_report} - W1 * I}{1 - I};$$

Thus, according to the pre-set offset index I, the horizontal coordinate of the touch point X_report and the length of the arc of the chamfered-rounded-angle in the X-axis direction W1, by using the above correction formula, the actual horizontal coordinate of the touch point X_fact can be calculated.

It should be noted that, due to the size of the arc edge of the glass, material of glass, and other factors, the offset indices I of different glass screens are not the same, and the offset index I can be calculated through big data.

According to the present embodiment, by determining whether the touch point falls within the chamfered-rounded-angle area of the glass screen, if the touch point falls within the chamfered-rounded-angle area, the coordinate of the touch point can be corrected and the corrected coordinate of the touch point is reported, so as to achieve the accurate positioning of the touch point. This solves the problem that the touch point in the chamfered-rounded-angle area of the edge of the glass screen does not correspond to the action point (the point displayed on the screen), and improves the accidental-touch prevention effect of the mobile terminal, providing a better touch screen experience for the terminal users.

In addition, the embodiment is implemented in the driver layer rather than firmware, which makes the software design of the mobile terminal can get rid of the restrictions of the touch screen IC suppliers, and improves the design flexibility of the accidental-touch-prevention-area function of mobile terminals. The correction algorithm can be used in any touch screen driver, and the program code for coordinate correction is easy to maintain.

Figure 3:
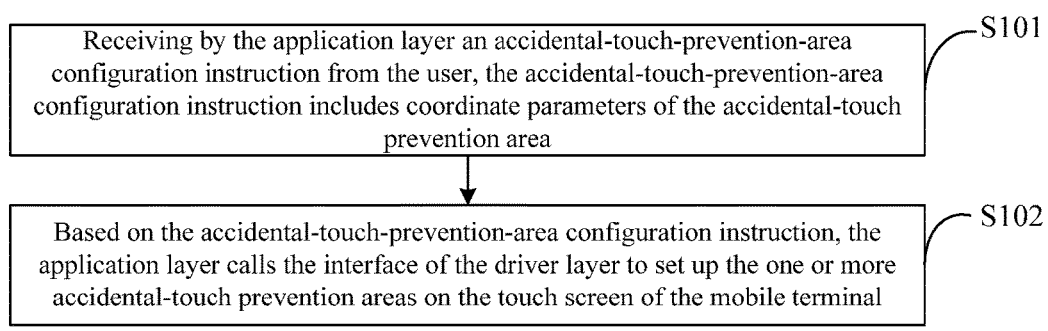
FIG. 3 is a flowchart of an accidental-touch prevention method for mobile terminals according to a second embodiment of the present disclosure.

Referring to FIG. 3, an accidental-touch prevention method for mobile terminals according to a second embodiment of the present disclosure is provided, which is based on the first embodiment, the mobile terminal accidental-touch prevention method further includes the followings:

Step S101, receiving by the application layer an accidental-touch-prevention-area configuration instruction from the user, the accidental-touch-prevention-area configuration instruction includes coordinate parameters of the accidental-touch prevention area; the accidental-touch-prevention-area configuration instruction can be instructions input by user, and can be pre-set instructions set in the mobile terminal.

Taking the mobile phone as an example, developers or mobile terminal users can set the accidental-touch prevention area according to the actual situation. The application layer provides an interactive interface and receives the accidental-touch-prevention-area configuration instruction from the user through the interactive interface. The user can input the relevant coordinate parameters of the accidental-touch prevention area through the interactive interface, so as to determine the shape, size, and location of the accidental-touch prevention area(s). The size correspond to the area of the accidental-touch prevention area.

Further, the accidental-touch prevention area may be a rectangle, and the edge of the accidental-touch prevention area may be an arc shape adapted to the shape of the edge of the mobile phone.

Figure 4:
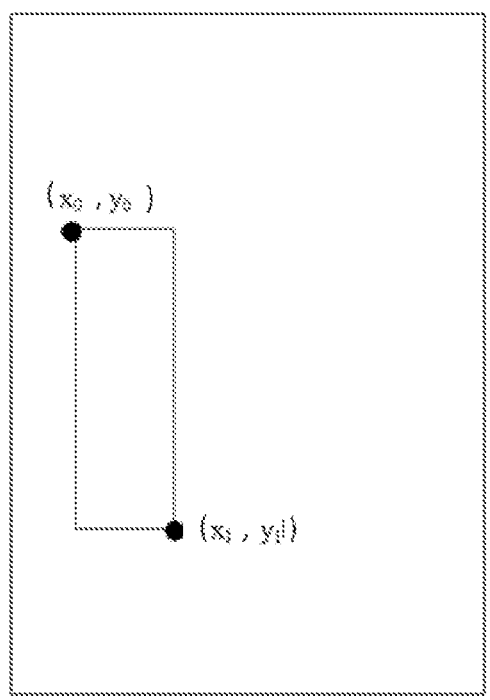
FIG. 4 is a schematic diagram of a shape of an accidental-touch prevention area according to embodiments of the present disclosure.

Using the rectangle for example, referring to FIG. 4, the outer frame represents the display screen, the area filled with white is the accidental-touch prevention area, the basic shape of which is rectangle. The coordinate parameters of the accidental-touch prevention area can be coordinates of two diagonal vertices of the accidental-touch prevention area $(x_0, y_0)$, $(x_1, y_1)$. That is, the location and size of the accidental-touch prevention area are determined when the coordinates of two diagonal vertices are inputted.

For accidental-touch prevention areas having other shapes, the coordinate parameters can be set under similar principles to determine the location and size of the accidental-touch prevention areas.

Step S102, based on the accidental-touch-prevention-area configuration instruction, the application layer calls the interface of the driver layer to set up the one or more accidental-touch prevention areas on the touch screen of the mobile terminal.

According to the user's holding habit on mobile phones, the accidental-touch prevention area can be set on the edge of the mobile phone, such as the two sides (referring to FIG. 5), the upper edge, and/or the lower edge etc.

Figure 5:
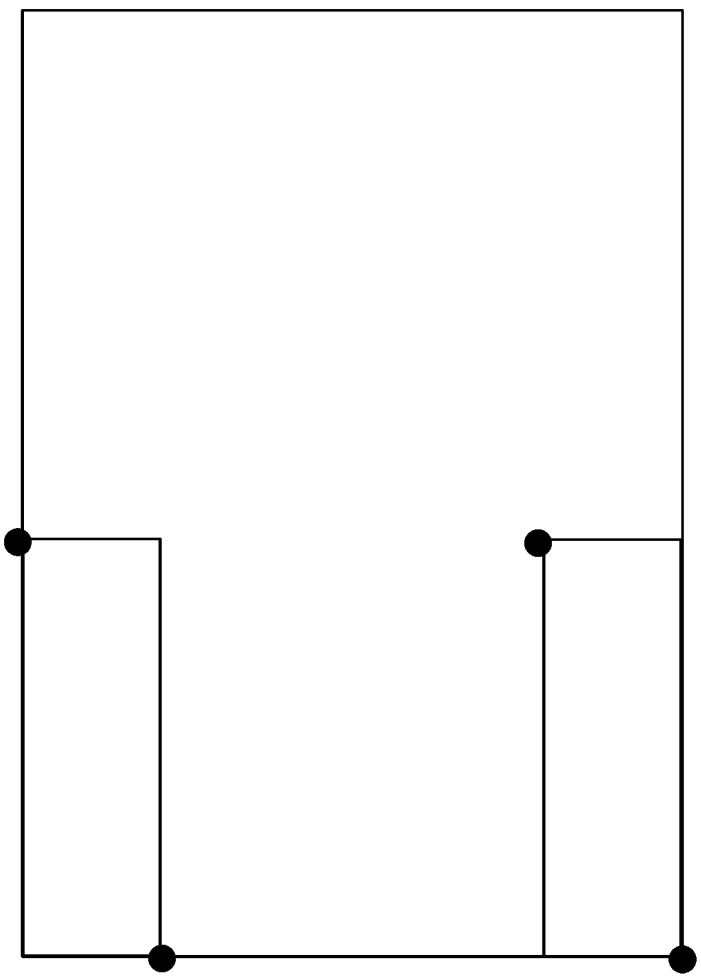
FIG. 5 is a schematic diagram of a location of an accidental-touch prevention area according to embodiments of the present disclosure.

In addition, the number of the accidental-touch prevention areas can be set by the user, which can be one or more. When there is a plurality of accidental-touch prevention areas, the plurality of accidental-touch prevention areas may be respectively located on the left side, the right side, as shown in FIG. 5, or the upper edge, and/or the lower edge of the touch screen of the mobile terminal.

That is, after receiving the accidental-touch-prevention-area configuration instruction, and based on the coordinate parameters in the accidental-touch-prevention-area configuration instruction, the application layer calls the interface provided by the driver layer to set the one or more accidental-touch prevention areas on the corresponding locations of the touch screen of the mobile terminal.

Because, in the present embodiment, the accidental-touch-prevention-area function is realized in the driver layer, the number, location, and size of the accidental-touch prevention areas can be freely set through the application layer. In the current accidental-touch prevention area design schemes, the accidental-touch-prevention-area function is achieved in the IC firmware, and the number, location and size of the accidental-touch prevention areas cannot be changed once set up. Thus, in the embodiment of the present disclosure, the accidental-touch-prevention-area function is achieved in the driver layer. On one hand, the number, location and size of the accidental-touch prevention areas can be freely set through the application layer; on the other hand, the accidental-touch-prevention-area function is implemented in the driver layer rather than firmware, which makes it easy for the software design of the mobile terminal to get rid of the restriction of the touch screen IC suppliers, so as to provide a better accidental-touch prevention effect to terminal users, and to improve the design flexibility of the accidental-touch-prevention-area function of mobile terminals.

Figure 6:
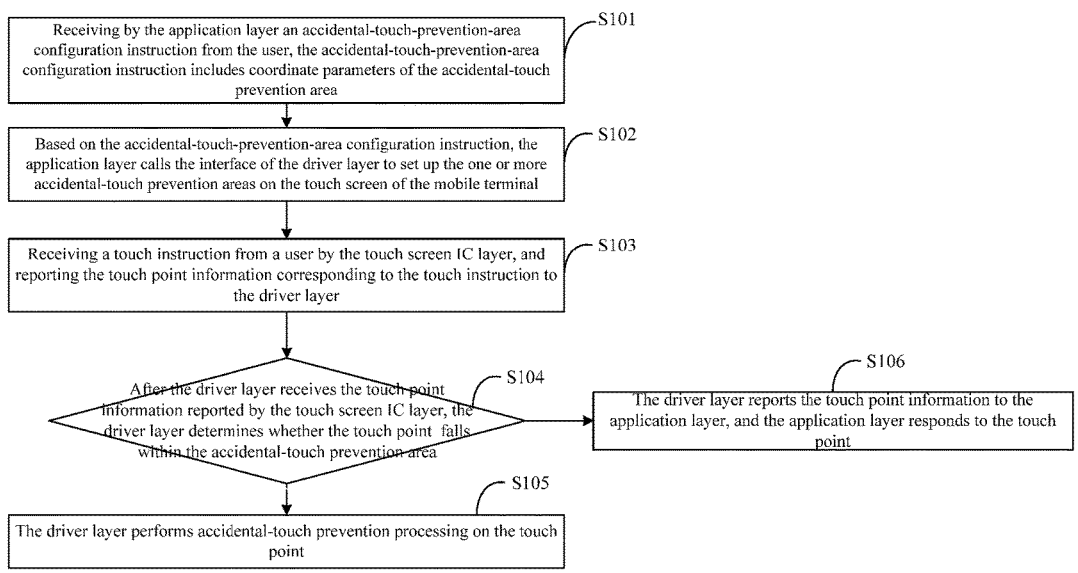
FIG. 6 is a flowchart of an accidental-touch prevention method for mobile terminals according to a third embodiment of the present disclosure.

Referring to FIG. 6, an accidental-touch prevention method for mobile terminals according to a third embodiment of the present disclosure is provided, which is based on the first embodiment and/or the second embodiment, and the mobile terminal accidental-touch prevention method includes the followings.

Step S103, receiving a touch instruction from a user by the touch screen IC layer, and reporting the touch point information corresponding to the touch instruction to the driver layer.

Step S104, after the driver layer receives the touch point information reported by the touch screen IC layer, the driver layer determines whether the touch point according to the touch point information falls within the accidental-touch prevention area. If yes, the method proceeds to step S105 and, otherwise, proceeds to step S106.

Step S105, the driver layer performs accidental-touch prevention processing on the touch point.

Step S106, the driver layer reports the touch point information to the application layer, and the application layer responds to the touch point.

Compared to the previous embodiments, the present embodiment further includes a process for responding to the user's touch instruction and performing the accidental-touch prevention processing on the user's accidental operation.

Optionally, according to the touch screen provided with the accidental-touch prevention areas as in the above embodiment, when the user performs a touch operation on the touch screen, the touch screen IC layer receives the user's touch instruction, and reports the touch point information in the touch instruction to the driver layer.

After the driver layer receives the touch point information reported by the touch screen IC layer, the driver layer determines whether the touch point according to the touch point information falls within the accidental-touch prevention area, so as to filter the touch point. The driver layer performs the accidental-touch prevention processing on the touch point falling within the accidental-touch prevention area. That is, the driver layer does not directly report the touch point to the application layer. Further, the driver layer reports the touch point not falling within the accidental-touch prevention area to the application layer, and the application layer performs corresponding responding operation.

Thus, in the present embodiment, the driver layer provides an interface for the application layer to call and, when the application layer receives the accidental-touch-prevention-area configuration instruction from a user, the application layer calls the interface provided by the driver layer to set the one or more accidental-touch prevention areas on the corresponding locations of the touch screen of the mobile terminal. Comparing to current accidental-touch prevention area design schemes, the accidental-touch-prevention-area function by the touch screen IC manufacturers is achieved in the IC firmware, and the number, location and size of the accidental-touch prevention areas cannot be changed once set up. Thus, in the embodiment of the present disclosure, the accidental-touch-prevention-area function is achieved in the driver layer. On one hand, the number, location and size of the accidental-touch prevention areas can be freely set through the application layer; on the other hand, the accidental-touch-prevention-area function is implemented in the driver layer rather than firmware, which makes it easy for the software design of the mobile terminal to get rid of the restriction of the touch screen IC suppliers, and to improve the design flexibility of the accidental-touch-prevention-area function of mobile terminals. Subsequently, after the driver layer receives the touch point information reported by the touch screen IC layer, the driver layer determines whether the touch point according to the touch point information falls within the accidental-touch prevention area, so as to filter the touch point. The driver layer performs the accidental-touch prevention processing on the touch point falling within the accidental-touch prevention area. That is, the driver layer does not directly report the touch point to the application layer. Further, the driver layer reports the touch point not falling within the accidental-touch prevention area to the application layer, and the application layer performs corresponding responding operation, providing a better accidental-touch prevention effect to the terminal users.

Figure 7:
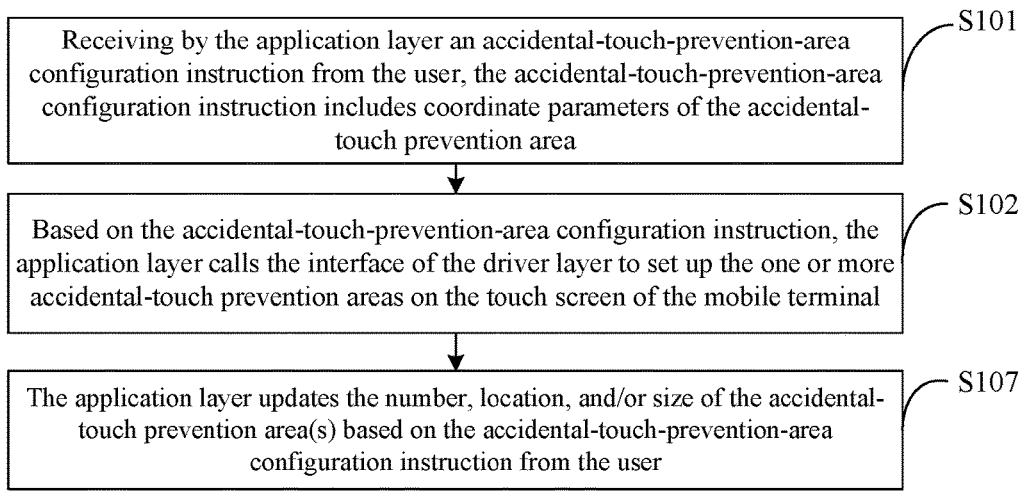
FIG. 7 is a flowchart of an accidental-touch prevention method for mobile terminals according to a fourth embodiment of the present disclosure.

Referring to FIG. 7, an accidental-touch prevention method for mobile terminals according to a fourth embodiment of the present disclosure is provided, which is based on the first embodiment, the second embodiment and/or the third embodiment, the method further includes the followings:

Step S107, the application layer updates the number, location, and/or size of the accidental-touch prevention area(s) based on the accidental-touch-prevention-area configuration instruction from the user.

Comparing to the previous embodiments, in the present embodiment, the application layer can update the number, location, and/or size of the accidental-touch prevention area(s) based on user needs, so as to improve the design flexibility of the accidental-touch-prevention-area function of mobile terminals, and to meet user needs.

Figure 8:
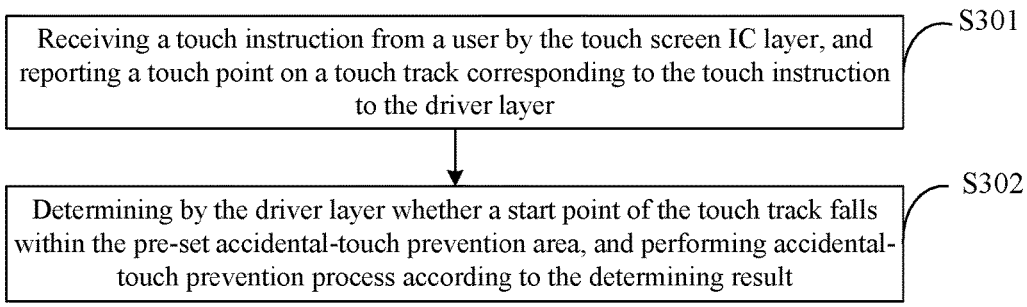
FIG. 8 is a flowchart of an accidental-touch prevention method for mobile terminals according to a fifth embodiment of the present disclosure.

Referring to FIG. 8, an accidental-touch prevention method for mobile terminals according to a fifth embodiment of the present disclosure is provided, which is based on the first embodiment, the second embodiment, the third embodiment and/or the fourth embodiment, the mobile terminal accidental-touch prevention method further includes the followings:

Step S301, receiving a touch instruction from a user by the touch screen IC layer, and reporting a touch point on a touch track corresponding to the touch instruction to the driver layer;

Step S302, determining by the driver layer whether a start point of the touch track falls within the pre-set accidental-touch prevention area, and performing accidental-touch prevention process according to the determining result.

The present embodiment is based on the above-described embodiments, to improve the accidental-touch prevention effect of the mobile terminal and to avoid erroneous judgment of the accidental-touch prevention processing, further refines the accidental-touch prevention processing of the mobile terminal.

The present embodiment takes into account that, when a user performs a sliding touch operation on the touch screen of a mobile phone, especially for a mobile phone with narrow frame or a frameless phone, not every point on the user's touch track always fall outside the accidental-touch prevention area. For instance, there may be a situation where the touch track passes through the edge part, and the edge part is provided with an accidental-touch prevention area. That is, some touch points of the touch track falls within the accidental-touch prevention area and, in this situation, if treating these touch points as accidental touch points and not reporting these touch points, it can cause erroneous judgement on touch points.

In view of this, the present embodiment provides an accidental-touch prevention algorithm design for the frameless or narrow-frame mobile terminal, uses the program code of the driver layer to realize the effective filtering of the accidental touch point, improving the accuracy for determining the accidental touch point. The present embodiment is implemented at the driver layer. The touch screen IC layer reports touch points to the touch screen driver layer at a pre-set time interval (such as every $\frac{1}{85}$ second), and the touch screen driver layer processes the touch points. The touch point identified as an accidental touch point is filtered, otherwise the touch point is reported to the application layer.

Further, the basic principle of the accidental-touch prevention algorithm of this present embodiment includes the followings:

When the user holds the mobile terminal, the accidental touch points are usually generated from the side edges of the screen. That is, the accidental touch points are concentrated on both sides of the touch screen. If the touch area between the hand and the terminal is large, the touch points generated may slide inward for a short distance from the edge. Thus, when the user's hand is performing normal touch operation, the start part of the touch track may fall within the accidental-touch prevention area and, in this situation, the touch operation is a valid operation and should not be filtered out.

Figure 9:
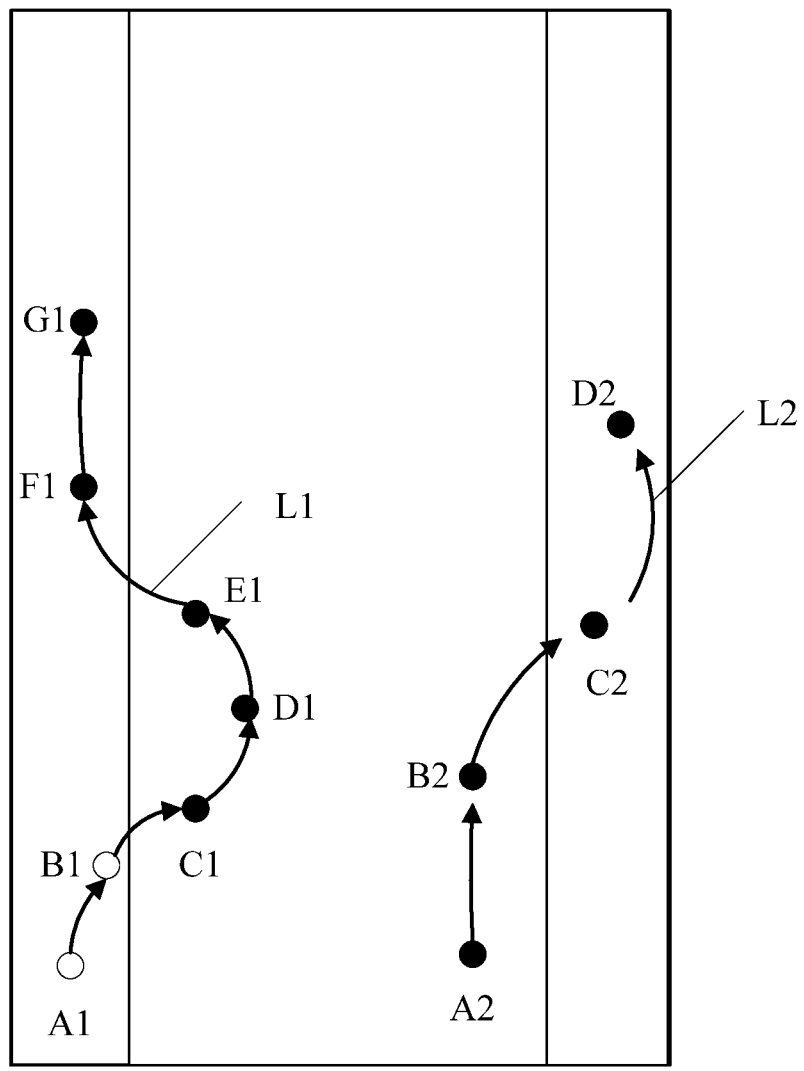
FIG. 9 is a schematic diagram of a touch track of the accidental-touch prevention algorithm in the embodiment of FIG. 8.

Based on the above principle, the specifics of accidental-touch prevention of the present embodiment is as follows:

Referring to FIG. 9, the touch screen IC layer receives the touch instruction from a user, and the touch screen IC layer reports the touch point on the touch track corresponding to the touch instruction to the driver layer.

The driver layer determines whether the start point of the touch track falls within the accidental-touch prevention area. When the start point of the touch track falls within the pre-set accidental-touch prevention area, the driver layer filters all the touch points on the touch track that fall within the accidental-touch prevention area before a first touch point that falls outside of the accidental-touch prevention area, and reports to the application layer all the touch points on the touch track after the first touch point falling outside of the accidental-touch prevention area.

If the start point of the touch track does not fall within the pre-set accidental-touch prevention area, the driver layer reports all the touch points on the touch track to the application layer.

Referring to FIG. 9, the whole frame represents the touch screen of the mobile phone, the accidental-touch prevention areas (the small rectangular areas in FIG. 9) are set on the left side and right side of the touch screen of the mobile phone, respectively. The user touches the left side of the touch screen to trigger a touch operation, which generates a touch track L1, and also touches the right side of the touch screen to trigger another touch operation, which generates a touch track L2. The dots on the touch track are the touch points reported by the touch screen IC layer to the driver layer, the black dots are reportable touch points, and the white dots are the filtered touch points.

The specific algorithm of accidental-touch prevention is as follows:

Each touch track is assigned an ID, and the attribute value of the touch point on each touch track is represented by S. The touch point with the attribute value S=0 needs to be reported to the application layer, and the touch point with the attribute value S=1 needs to be filtered.

The following principles are used to determine whether the touch points on the touch track need to be reported:

For the touch track L1, touch points A1, B1, C1, D1, E1, F1, G1 are on the touch track L1, among which touch points A1, B1, F1, G1 fall within the accidental-touch prevention area, and touch points C1, D1, E1 fall out of the accidental-touch prevention area, and the start point is A1 according to the arrow of the touch track L1.

Firstly, when the touch screen IC layer reports the touch points to the driver layer, the ID of the touch track and the coordinate parameters of the touch points on the touch track are reported to the driver layer.

For the start point A1, the driver layer determines that A1 falls within the accidental-touch prevention area, and sets the attribute value S of A1 to 1, which needs to be filtered out. The driver layer does not report the start point A1.

For the next touch point B1, the driver layer determines that B1 falls within the accidental-touch prevention area, and sets the attribute value S of B1 to 1, which needs to be filtered out. The driver layer does not report B1.

For the next touch point C1, the driver layer determines that C1 falls outside of the accidental-touch prevention area, and sets the attribute value S of C1 to 0, which needs to be reported. The driver layer reports touch point C1 and all the touch points after C1 (including D1, E1, F1, G1) to the application layer. Although the touch points F1 and G1 fall within the accidental-touch prevention area, these touch points are valid touch operation, and need to be reported.

For the touch track L2, the touch points A2, B2, C2, D2 are on the touch track L2, among which touch points A2, B2 fall outside of the accidental-touch prevention area, touch points C2, D2 fall within the accidental-touch prevention area, and the start point is A2 according to the arrow of the touch track L2.

Firstly, when the touch screen IC layer reports the touch point to the driver layer, the ID of the touch track and the coordinate parameters of the touch points on the touch track are reported to the driver layer.

For the start point A2, the driver layer determines that A2 falls outside of the accidental-touch prevention area, and sets the attribute value S of A2 to 0, which needs to be reported. The driver layer reports the start point A2 to the application layer.

For all the touch points after the start point A2 (including B2, C2, D2), the driver layer reports them to the application layer. Although the touch points C2, D2 fall within the accidental-touch prevention area, those touch points are valid touch operation, and need to be reported.

Thus, the present embodiment uses program code of the driver layer to realize the effective filtering of the accidental touch points, and improves the accuracy of the judgement of the accidental touch points.

The embodiments of the present disclosure can effectively filter out the accidental touch points in the accidental-touch prevention area, the accidental-touch prevention area is not dead area and, thus, it does not affect the normal operation of the user. In addition, the embodiments are implemented in the driver layer rather than firmware, which makes the software design of the mobile terminal can get rid of the restrictions of the touch screen IC suppliers, not to be affected by the touch screen firmware. The accidental-touch prevention algorithm can be used in any touch screen driver, and the program code of the accidental-touch prevention algorithm is easy to maintain.

Figure 10:
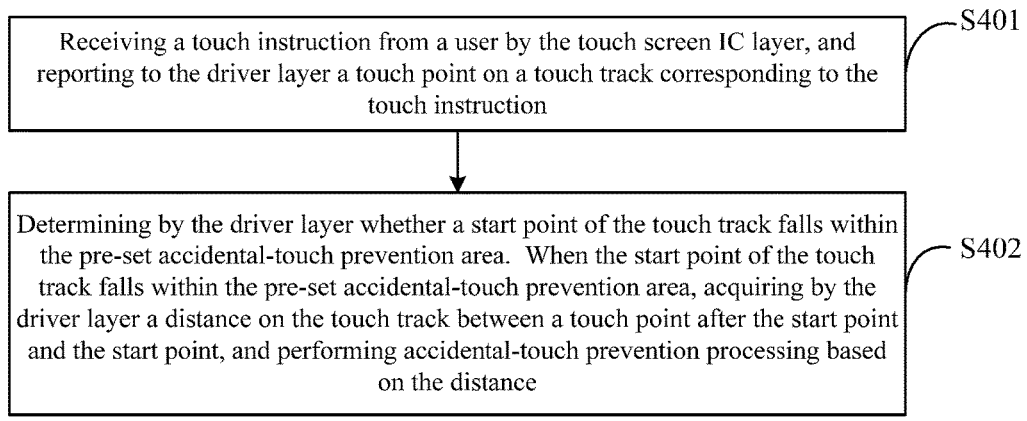
FIG. 10 is a flowchart of an accidental-touch prevention method for mobile terminals according to a sixth embodiment of the present disclosure.

Referring to FIG. 10, an accidental-touch prevention method for mobile terminals according to a sixth embodiment of the present disclosure is provided, which is based on the first embodiment, the second embodiment, the third embodiment, the fourth embodiment and/or the fifth embodiment, the mobile terminal accidental-touch prevention method further includes the followings:

Step S401, receiving a touch instruction from a user by the touch screen IC layer, and reporting to the driver layer a touch point on a touch track corresponding to the touch instruction.

Step S402, determining by the driver layer whether a start point of the touch track falls within the pre-set accidental-touch prevention area. When the start point of the touch track falls within the pre-set accidental-touch prevention area, acquiring by the driver layer a distance on the touch track between a touch point after the start point and the start point, and performing accidental-touch prevention processing based on the distance.

According to the present embodiment, to improve the accidental-touch prevention effect of the mobile terminal, and to avoid erroneous judgment on the touch screen gesture operation, the mobile terminal accidental-touch prevention method can include the following specifics.

The present embodiment takes into account that some sliding gesture operations on the touch screen may fall within the accidental-touch prevention area, and the touch points of these sliding gesture operations should be reported to the application layer.

The basic principle of the accidental-touch prevention algorithm of this present embodiment includes the followings:

In general, the displacement of the accidental touch point on the X-axis and Y-axis is relatively small, while the touch screen gestures have a relatively larger displacement. Such difference may be used to determine whether the touch point (touch track) in the accidental-touch prevention area is an accidental touch point (touch track) or a touch screen gesture.

Optionally, when the start point of the touch track falls within the pre-set accidental-touch prevention area, the driver layer records the coordinate of the start point.

The driver layer obtains the coordinate of a next touch point after the start point and, based on the coordinate of the start point and the coordinate of the next touch point, calculates a distance D. If D is greater than a pre-set threshold, it is determined that the current touch operation is a touch-screen gesture, the next touch point and all touch points after the next touch point on the touch track are reported to the application layer, or all the touch points on the touch track are reported to the application layer. If D is less than or equal to the pre-set threshold, the next touch point is not reported, proceeding to determine a touch point after the next touch point.

Figure 11:
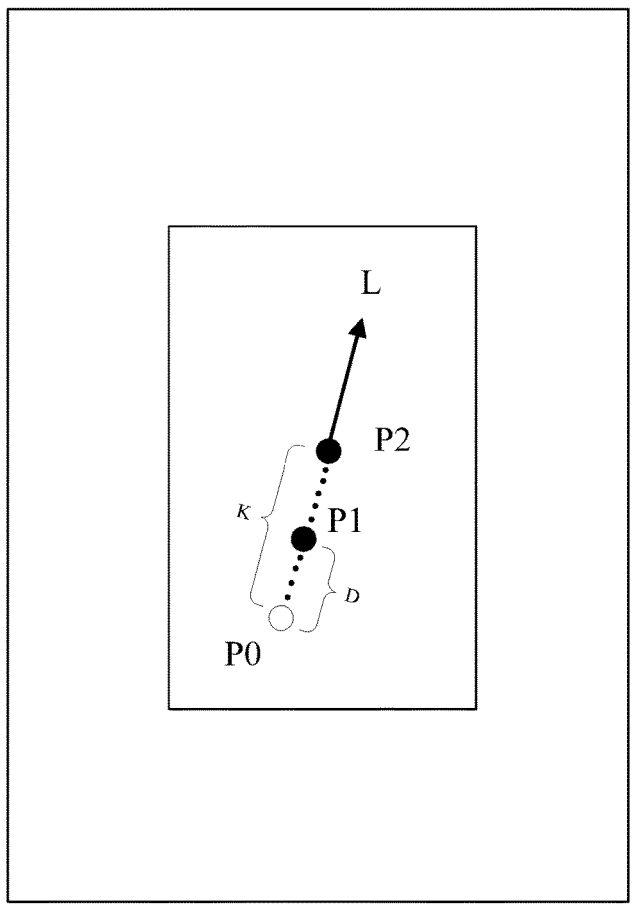
FIG. 11 is a schematic diagram of a touch track of the accidental-touch prevention algorithm in the embodiment of FIG. 10.

Referring to FIG. 11, the outer frame in FIG. 11 is the frame of the touch screen of the mobile terminal, and the small rectangle is the accidental-touch prevention area. In the accidental-touch prevention area, a touch track L is generated by the user, which includes the start point P0, and other touch points P1, P2, etc. The accidental-touch prevention algorithm of the present disclosure includes following:

At first, the driver layer determines whether the start point P0 falls within the accidental-touch prevention area. It is determined that the start point P0 falls within the accidental-touch prevention area, and the driver layer records the coordinate of the start point P0.

Then, the driver layer obtains the coordinate of a next touch point P1 after the start point, calculates the distance D between P1 and P0 based on the coordinate of the start point P0 and the next touch point P1. If D is greater than a pre-set threshold K, it is determined that the current touch operation is a touch-screen gesture, the driver layer reports the touch points P1 and all touch points after the touch point P1 on the touch track to the application layer, or reports all the touch points on the touch track to the application layer;

If it is determined that D is less than or equal to the pre-set threshold K, then the next touch point P1 is not reported, the driver layer proceeds to determine a next touch point P2. If the touch point P2 meets the above-mentioned condition, the driver layer reports the touch points P2 and all touch points after the touch point P2 on the touch track to the application layer, or reports all the touch points on the touch track to the application layer.

That is, the touch screen IC reports the touch point to the touch screen driver layer, and the touch screen driver layer processes the touch point. If the start point P0 of line L falls within the accidental-touch prevention area, the coordinate of the start point is recorded. Afterwards, when the IC firmware reports touch point information, the distance D between the touch point and P0 on line L is compared with the threshold. If D is less than the threshold, the touch point on the line L is not reported; if D is greater than the threshold, the line L is regarded as a touch screen gesture, all the touch points on the line L are reported or the current touch point and all touch points after the current touch point are reported.

In one embodiment, in FIG. 11, both the dashed line and the solid line are part of the line L, the dashed line is the filtered part, and the solid line is the part that is reported as the touch screen gesture.

In the above determination process, when the start point of the touch track does not fall within the pre-set accidental-touch prevention area, the driver layer may report all the touch points on the touch track to the application layer.

According to the present disclosure, the driver layer program can be used to realize the effective filtering of the accidental touch points, improving the accuracy of judgment of the accidental touch points. Further, the touch screen gestures in the accidental-touch prevention area can be recognized, preventing mistaken judgment of the touch screen gestures.

The embodiments of the present disclosure can effectively filter out the accidental touch points in the accidental-touch prevention area, the accidental-touch prevention area is not dead area and, thus, it does not affect the normal operation of the user, as the accidental-touch prevention algorithm does not filter out touch screen gestures. In addition, the embodiments are implemented in the driver layer rather than firmware, which makes the software design of the mobile terminal can get rid of the restrictions of the touch screen IC suppliers, not to be affected by the touch screen firmware. The accidental-touch prevention algorithm can be used in any touch screen driver, and the program code of the accidental-touch prevention algorithm is easy to maintain.

It should be noted that features of the various above-described embodiments can be implemented in combination with each other.

Figure 12:
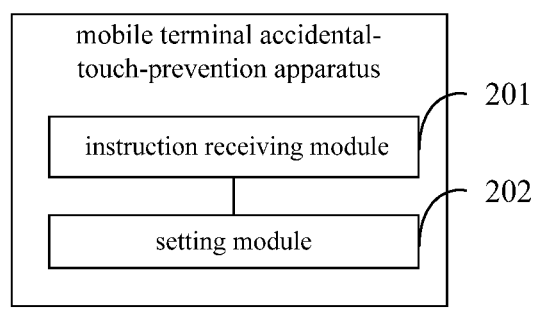
FIG. 12 is a functional block diagram of an accidental-touch prevention apparatus for mobile terminals according to the first embodiment of the present disclosure.

Referring to FIG. 12, an accidental-touch-prevention apparatus for a mobile terminal according to the first embodiment of the present disclosure is provided. The touch control unit of the mobile terminal includes: an application layer, a driver layer, and a touch screen IC layer. The driver layer provides an interface for the application layer to call, and the mobile terminal accidental-touch-prevention apparatus with a touch screen includes: an instruction receiving module 201 and a setting module 202.

The instruction receiving module 201 is configured to receive an accidental-touch-prevention-area configuration instruction from a user by the application layer, and the accidental-touch-prevention-area configuration instruction includes coordinate parameters of the accidental-touch prevention area;

The setting module 202 is configured to, based on the accidental-touch-prevention-area configuration instruction and through the application layer, call the interface of the driver layer to set up the one or more accidental-touch prevention areas on the touch screen of the mobile terminal.

The present embodiment flexibly sets the accidental-touch prevention areas by using the code in the driver layer, and the driver layer has an interface for the application layer to call. The application layer calls the interface to have the driver layer realize the flexible configuration of the number, location, size of the accidental-touch prevention areas.

By setting the accidental-touch prevention areas, when the touch screen IC layer receives the user's touch instruction, the touch instruction is reported to the driver layer, and the driver layer determines the touch instruction reported by the touch screen IC layer. The driver layer filters the touch points, performs the accidental-touch prevention processing on the touch point falling within the accidental-touch prevention area, i.e., not reporting to the application layer, and reports to the application layer the touch points falling outside of the accidental-touch prevention area. The application layer performs corresponding responding operations on the reported touch points.

Optionally, the mobile terminal accidental-touch-prevention apparatus can be implemented on a mobile phone, a tablet or other touch control terminals.

Using the mobile phone as an example, developers or mobile terminal users can set the accidental-touch prevention area according to the actual situation. The application layer provides an interactive interface and receives the accidental-touch-prevention-area configuration instruction from the user through the interactive interface. The user can input the relevant coordinate parameters of the accidental-touch prevention area through the interactive interface, so as to determine the shape, size, and location of the accidental-touch prevention area(s).

Further, the accidental-touch prevention area may be a rectangle, and the edge of the accidental-touch prevention area may be an arc shape adapted to the shape of the edge of the mobile phone.

Using the rectangle for example, referring to FIG. 4, the outer frame represents the display screen, the area filled with white is the accidental-touch prevention area, the basic shape of which is rectangle. The coordinate parameters of the accidental-touch prevention area can be coordinates of two diagonal vertices of the accidental-touch prevention area $(x_0, y_0)$, $(x_1, y_1)$. That is, the location and size of the accidental-touch prevention area are determined when the coordinates of two diagonal vertices are inputted.

For accidental-touch prevention areas having other shapes, the coordinate parameters can be set under similar principles to determine the location and size of the accidental-touch prevention areas.

According to the user's holding habit on mobile phones, the accidental-touch prevention area can be set on the edge of the mobile phone, such as the two sides (referring to FIG. 5), the upper edge, and/or the lower edge etc.

In addition, the number of the accidental-touch prevention areas can be set by the user, which can be one or more. When there are a plurality of accidental-touch prevention areas, the plurality of accidental-touch prevention areas may be respectively located on the left side, the right side, as shown in FIG. 5, or the upper edge, and/or the lower edge of the touch screen of the mobile terminal.

That is, after receiving the accidental-touch-prevention-area configuration instruction, and based on the coordinate parameters in the accidental-touch-prevention-area configuration instruction, the application layer calls the interface provided by the driver layer to set the one or more accidental-touch prevention areas on the corresponding locations of the touch screen of the mobile terminal.

Because, in the present embodiment, the accidental-touch-prevention-area function is realized in the driver layer, the number, location, and size of the accidental-touch prevention areas can be freely set through the application layer. In the current accidental-touch prevention area design schemes, the accidental-touch-prevention-area function is achieved in the IC firmware, and the number, location and size of the accidental-touch prevention areas cannot be changed once set up. Thus, in the embodiment of the present disclosure, the accidental-touch-prevention-area function is achieved in the driver layer. On one hand, the number, location and size of the accidental-touch prevention areas can be freely set through the application layer; on the other hand, the accidental-touch-prevention-area function is implemented in the driver layer rather than firmware, which makes it easy for the software design of the mobile terminal to get rid of the restriction of the touch screen IC suppliers, so as to provide a better accidental-touch prevention effect to terminal users, and to improve the design flexibility of the accidental-touch-prevention-area function of mobile terminals.

Figure 13:
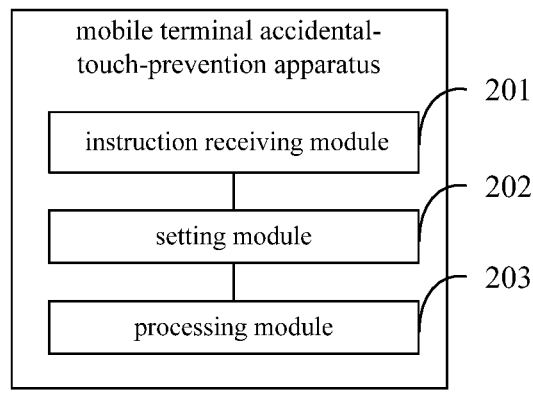
FIG. 13 is a functional block diagram of an accidental-touch prevention apparatus for mobile terminals according to the second embodiment of the present disclosure.

Referring to FIG. 13, an accidental-touch-prevention apparatus for a mobile terminal according to a second embodiment of the present disclosure is provided and, based on the above embodiment, the apparatus further includes the followings:

A processing module 203 configured to receive a touch instruction from a user by the touch screen IC layer, and to report the touch point information corresponding to the touch instruction to the driver layer. After the driver layer receives the touch point information reported by the touch screen IC layer, the driver layer determines whether the touch point according to the touch point information falls within the accidental-touch prevention area. If yes, the driver layer performs accidental-touch prevention processing on the touch point; if no, the driver layer reports the touch point information to the application layer, and the application layer responds to the touch point.

Compared to the previous embodiment, the present embodiment further includes a process for responding to the user's touch instruction and performing the accidental-touch prevention processing on the user's accidental operation.

Optionally, according to the touch screen provided with the accidental-touch prevention areas as in the above embodiment, when the user performs a touch operation on the touch screen, the touch screen IC layer receives the user's touch instruction, and reports the touch point information in the touch instruction to the driver layer.

After the driver layer receives the touch point information reported by the touch screen IC layer, the driver layer determines whether the touch point according to the touch point information falls within the accidental-touch prevention area, so as to filter the touch point. The driver layer performs the accidental-touch prevention processing on the touch point falling within the accidental-touch prevention area. That is, the driver layer does not directly report the touch point to the application layer. Further, the driver layer reports the touch point not falling within the accidental-touch prevention area to the application layer, and the application layer performs corresponding responding operation.

Thus, in the present embodiment, the driver layer provides an interface for the application layer to call and, when the application layer receives the accidental-touch-prevention-area configuration instruction from a user, the application layer calls the interface provided by the driver layer to set the one or more accidental-touch prevention areas on the corresponding locations of the touch screen of the mobile terminal. Comparing to current accidental-touch prevention area design schemes, the accidental-touch-prevention-area function by the touch screen IC manufacturers is achieved in the IC firmware, and the number, location and size of the accidental-touch prevention areas cannot be changed once set up. Thus, in the embodiment of the present disclosure, the accidental-touch-prevention-area function is achieved in the driver layer. On one hand, the number, location and size of the accidental-touch prevention areas can be freely set through the application layer; on the other hand, the accidental-touch-prevention-area function is implemented in the driver layer rather than firmware, which makes it easy for the software design of the mobile terminal to get rid of the restriction of the touch screen IC suppliers, and to improve the design flexibility of the accidental-touch-prevention-area function of mobile terminals. Subsequently, after the driver layer receives the touch point information reported by the touch screen IC layer, the driver layer determines whether the touch point according to the touch point information falls within the accidental-touch prevention area, so as to filter the touch point. The driver layer performs the accidental-touch prevention processing on the touch point falling within the accidental-touch prevention area. The driver layer reports the touch point not falling within the accidental-touch prevention area to the application layer, and the application layer performs corresponding responding operation, providing a better accidental-touch prevention effect to the terminal users.

Figure 14:
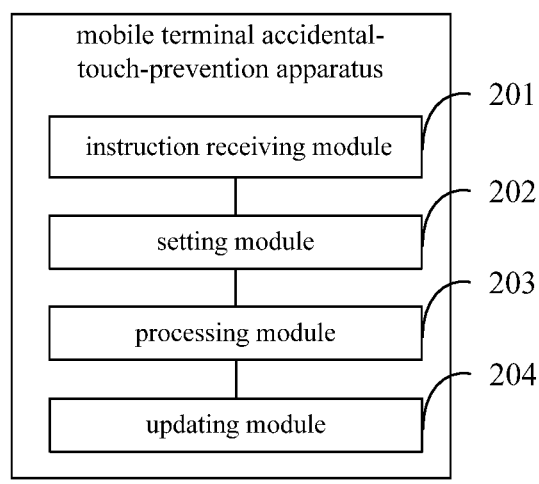
FIG. 14 is a functional block diagram of an accidental-touch prevention apparatus for mobile terminals according to the third embodiment of the present disclosure.

Referring to FIG. 14, an accidental-touch-prevention apparatus for a mobile terminal according to a third embodiment of the present disclosure is provided and, based on the above embodiment, the apparatus further includes the followings:

An updating module 204 configured to update the number, location, and/or size of the accidental-touch prevention area(s) based on the accidental-touch-prevention-area configuration instruction from the user by the application layer.

Comparing to the previous embodiments, in the present embodiment, the application layer can update the number, location, and/or size of the accidental-touch prevention area(s) based on user needs, so as to improve the design flexibility of the accidental-touch-prevention-area function of mobile terminals, and to meet user needs.

Optionally, in another embodiment of the present disclosure, the instruction receiving module 201 is further configured to receive a touch instruction from a user by the touch screen IC layer, and to report a touch point on a touch track corresponding to the touch instruction to the driver layer.

The processing module 203 is further configured to determine whether a start point of the touch track falls within the pre-set accidental-touch prevention area by the driver layer, and to perform accidental-touch prevention process according to the determining result.

The processing module 203 is also configured to determine whether the start point of the touch track falls within the accidental-touch prevention area by the driver layer. When the start point of the touch track falls within the pre-set accidental-touch prevention area, the driver layer reports the touch point falling within the accidental-touch prevention area to the application layer, and filters the touch point falling outside of the accidental-touch prevention area. When the start point of the touch track does not fall within the pre-set accidental-touch prevention area, the driver layer reports all the touch points on the touch track to the application layer.

The present embodiment is based on the above-described embodiments, to improve the accidental-touch prevention effect of the mobile terminal and to avoid erroneous judgment of the accidental-touch prevention processing, further refines the accidental-touch prevention processing of the mobile terminal.

The present embodiment takes into account that, when a user performs a sliding touch operation on the touch screen of a mobile phone, especially for a mobile phone with narrow frame or a frameless phone, not every point on the user's touch track always fall outside the accidental-touch prevention area. For instance, there may be a situation where the touch track passes through the edge part, and the edge part is provided with an accidental-touch prevention area. That is, some touch points of the touch track falls within the accidental-touch prevention area and, in this situation, if treating these touch points as accidental touch points and not reporting these touch points, it can cause erroneous judgement on touch points.

In view of this, the present embodiment provides an accidental-touch prevention algorithm design for the frameless or narrow-frame mobile terminal, uses the program code of the driver layer to realize the effective filtering of the accidental touch point, improving the accuracy for determining the accidental touch point. The present embodiment is implemented at the driver layer. The touch screen IC layer reports touch points to the touch screen driver layer at a pre-set time interval (such as every $\frac{1}{85}$ second), and the touch screen driver layer processes the touch points. The touch point identified as an accidental touch point is filtered, otherwise the touch point is reported to the application layer.

Further, the basic principle of the accidental-touch prevention algorithm of this present embodiment includes the followings:

When the user holds the mobile terminal, the accidental touch points are usually generated from the side edges of the screen. That is, the accidental touch points are concentrated on both sides of the touch screen. If the touch area between the hand and the terminal is large, the touch points generated may slide inward for a short distance from the edge. Thus, when the user's hand is performing normal touch operation, the start part of the touch track may fall within the accidental-touch prevention area and, in this situation, the touch operation is a valid operation and should not be filtered out.

Based on the above principle, the specifics of accidental-touch prevention of the present embodiment is as follows:

Referring to FIG. 9, the touch screen IC layer receives the touch instruction from a user, and the touch screen IC layer reports the touch point on the touch track corresponding to the touch instruction to the driver layer.

The driver layer determines whether the start point of the touch track falls within the accidental-touch prevention area. When the start point of the touch track falls within the pre-set accidental-touch prevention area, the driver layer filters all the touch points on the touch track that fall within the accidental-touch prevention area before a first touch point that falls outside of the accidental-touch prevention area, and reports to the application layer all the touch points on the touch track after the first touch point falling outside of the accidental-touch prevention area.

If the start point of the touch track does not fall within the pre-set accidental-touch prevention area, the driver layer reports all the touch points on the touch track to the application layer.

Referring to FIG. 9, the whole frame represents the touch screen of the mobile phone, the accidental-touch prevention areas (the small rectangular areas in FIG. 9) are set on the left side and right side of the touch screen of the mobile phone, respectively. The user touches the left side of the touch screen to trigger a touch operation, which generates a touch track L1, and also touches the right side of the touch screen to trigger another touch operation, which generates a touch track L2. The dots on the touch track are the touch points reported by the touch screen IC layer to the driver layer, the black dots are reportable touch points, and the white dots are the filtered touch points.

The specific algorithm of accidental-touch prevention is as follows:

Each touch track is assigned an ID, and the attribute value of the touch point on each touch track is represented by S. The touch point with the attribute value S=0 needs to be reported to the application layer, and the touch point with the attribute value S=1 needs to be filtered.

The following principles are used to determine whether the touch points on the touch track need to be reported:

For the touch track L1, touch points A1, B1, C1, D1, E1, F1, G1 are on the touch track L1, among which touch points A1, B1, F1, G1 fall within the accidental-touch prevention area, and touch points C1, D1, E1 fall out of the accidental-touch prevention area, and the start point is A1 according to the arrow of the touch track L1.

Firstly, when the touch screen IC layer reports the touch points to the driver layer, the ID of the touch track and the coordinate parameters of the touch points on the touch track are reported to the driver layer.

For the start point A1, the driver layer determines that A1 falls within the accidental-touch prevention area, and sets the attribute value S of A1 to 1, which needs to be filtered out. The driver layer does not report the start point A1.

For the next touch point B1, the driver layer determines that B1 falls within the accidental-touch prevention area, and sets the attribute value S of B1 to 1, which needs to be filtered out. The driver layer does not report B1.

For the next touch point C1, the driver layer determines that C1 falls outside of the accidental-touch prevention area, and sets the attribute value S of C1 to 0, which needs to be reported. The driver layer reports touch point C1 and all the touch points after C1 (including D1, E1, F1, G1) to the application layer. Although the touch points F1 and G1 fall within the accidental-touch prevention area, these touch points are valid touch operation, and need to be reported.

For the touch track L2, the touch points A2, B2, C2, D2 are on the touch track L2, among which touch points A2, B2 fall outside of the accidental-touch prevention area, touch points C2, D2 fall within the accidental-touch prevention area, and the start point is A2 according to the arrow of the touch track L2.

Firstly, when the touch screen IC layer reports the touch point to the driver layer, the ID of the touch track and the coordinate parameters of the touch points on the touch track are reported to the driver layer.

For the start point A2, the driver layer determines that A2 falls outside of the accidental-touch prevention area, and sets the attribute value S of A2 to 0, which needs to be reported. The driver layer reports the start point A2 to the application layer.

For all the touch points after the start point A2 (including B2, C2, D2), the driver layer reports them to the application layer. Although the touch points C2, D2 fall within the accidental-touch prevention area, those touch points are valid touch operation, and need to be reported.

Thus, the present embodiment uses program code of the driver layer to realize the effective filtering of the accidental touch points, and improves the accuracy of the judgement of the accidental touch points.

The embodiments of the present disclosure can effectively filter out the accidental touch points in the accidental-touch prevention area, the accidental-touch prevention area is not dead area and, thus, it does not affect the normal operation of the user. In addition, the embodiments are implemented in the driver layer rather than firmware, which makes the software design of the mobile terminal can get rid of the restrictions of the touch screen IC suppliers, not to be affected by the touch screen firmware. The accidental-touch prevention algorithm can be used in any touch screen driver, and the program code of the accidental-touch prevention algorithm is easy to maintain.

Optionally, in another embodiment of the present disclosure, the instruction receiving module 201 is configured to receive a touch instruction from the user by the touch screen IC layer, and to report a touch point on a touch track corresponding to the touch instruction to the driver layer.

The processing module 203 is configured to, when a start point of the touch track falls within the pre-set accidental-touch prevention area, acquire by the driver layer a distance on the touch track between a touch point after the start point and the start point, and to perform accidental-touch prevention processing based on the distance.

The processing module 203 is further configured to, analyze a pre-set number of reported touch points, determine the pre-set offset index. Wherein the pre-set number can be larger than a pre-set threshold. The pre-set threshold is generally a relatively large number, and can be set up when the mobile terminal out of the factory. For example, the processing module 203 is configured to calculate the pre-set offset index using the following formula: $X\_{fact}$+Offset=$X\_{report}$; Offset=$(W1-X\_{fact})*I$; wherein X_fact is the actual horizontal coordinate of the touch point; X_report is the coordinate reported by the touch screen IC layer; Offset is the offset value; I is the pre-set offset index; W1 is the length of the arc of the chamfered-rounded-angle in the X-axis direction.

Optionally, the instruction receiving module 201 is further configured to, receive an accidental-touch-prevention-area configuration instruction by the application layer, the accidental-touch-prevention-area configuration instruction includes coordinate parameters of the accidental-touch prevention area; the processing module 202 is configured to call the interface of the driver layer by the application layer based on the accidental-touch-prevention-area configuration instruction, and to set up the one or more accidental-touch prevention areas on the touch screen of the mobile terminal.

Optionally, the instruction receiving module 201 is further configured to, receive a touch instruction from a user by the touch screen IC layer, and report the touch point information corresponding to the touch instruction to the driver layer; the processing module 203 is configured to determine whether the touch point according to the touch point information falls within the accidental-touch prevention area by the driver layer; perform accidental-touch prevention processing on the touch point when the touch point according to the touch point information falls within the accidental-touch prevention area by the driver layer; otherwise, report the touch point information to the application layer by the driver layer, and respond to the touch point by the application layer.

According to the present embodiment, to improve the accidental-touch prevention effect of the mobile terminal, and to avoid erroneous judgment on the touch screen gesture operation, the mobile terminal accidental-touch prevention method can include the following specifics.

The present embodiment takes into account that some sliding gesture operations on the touch screen may fall within the accidental-touch prevention area, and the touch points of these sliding gesture operations should be reported to the application layer.

The basic principle of the accidental-touch prevention algorithm of this present embodiment includes the followings:

In general, the displacement of the accidental touch point on the X-axis and Y-axis is relatively small, while the touch screen gestures have a relatively larger displacement. Such difference may be used to determine whether the touch point (touch track) in the accidental-touch prevention area is an accidental touch point (touch track) or a touch screen gesture.

Optionally, when the start point of the touch track falls within the pre-set accidental-touch prevention area, the driver layer records the coordinate of the start point.

The driver layer obtains the coordinate of a next touch point after the start point and, based on the coordinate of the start point and the coordinate of the next touch point, calculates a distance D. If D is greater than a pre-set threshold, it is determined that the current touch operation is a touch-screen gesture, the next touch point and all touch points after the next touch point on the touch track are reported to the application layer, or all the touch points on the touch track are reported to the application layer. If D is less than or equal to the pre-set threshold, the next touch point is not reported, proceeding to determine a touch point after the next touch point.

Referring to FIG. 11, the outer frame in FIG. 11 is the frame of the touch screen of the mobile terminal, and the small rectangle is the accidental-touch prevention area. In the accidental-touch prevention area, a touch track L is generated by the user, which includes the start point P0, and other touch points P1, P2, etc. The accidental-touch prevention algorithm of the present disclosure includes following:

At first, the driver layer determines whether the start point P0 falls within the accidental-touch prevention area. It is determined that the start point P0 falls within the accidental-touch prevention area, and the driver layer records the coordinate of the start point P0.

Then, the driver layer obtains the coordinate of a next touch point P1 after the start point, calculates the distance D between P1 and P0 based on the coordinate of the start point P0 and the next touch point P1. If D is greater than a pre-set threshold K, it is determined that the current touch operation is a touch-screen gesture, the driver layer reports the touch points P1 and all touch points after the touch point P1 on the touch track to the application layer, or reports all the touch points on the touch track to the application layer.

If it is determined that D is less than or equal to the pre-set threshold K, then the next touch point P1 is not reported, the driver layer proceeds to determine a next touch point P2. If the touch point P2 meets the above-mentioned condition, the driver layer reports the touch points P2 and all touch points after the touch point P2 on the touch track to the application layer, or reports all the touch points on the touch track to the application layer.

That is, the touch screen IC reports the touch point to the touch screen driver layer, and the touch screen driver layer processes the touch point. If the start point P0 of line L falls within the accidental-touch prevention area, the coordinate of the start point is recorded. Afterwards, when the IC firmware reports touch point information, the distance D between the touch point and P0 on line L is compared with the threshold. If D is less than the threshold, the touch point on the line L is not reported; if D is greater than the threshold, the line L is regarded as a touch screen gesture, all the touch points on the line L are reported or the current touch point and all touch points after the current touch point are reported.

In one embodiment, in FIG. 11, both the dashed line and the solid line are part of the line L, the dashed line is the filtered part, and the solid line is the part that is reported as the touch screen gesture.

In the above determination process, when the start point of the touch track does not fall within the pre-set accidental-touch prevention area, the driver layer may report all the touch points on the touch track to the application layer.

According to the present disclosure, the driver layer program can be used to realize the effective filtering of the accidental touch points, improving the accuracy of judgment of the accidental touch points. Further, the touch screen gestures in the accidental-touch prevention area can be recognized, preventing mistaken judgment of the touch screen gestures.

The embodiments of the present disclosure can effectively filter out the accidental touch points in the accidental-touch prevention area, the accidental-touch prevention area is not dead area and, thus, it does not affect the normal operation of the user, as the accidental-touch prevention algorithm does not filter out touch screen gestures. In addition, the embodiments are implemented in the driver layer rather than firmware, which makes the software design of the mobile terminal can get rid of the restrictions of the touch screen IC suppliers, not to be affected by the touch screen firmware. The accidental-touch prevention algorithm can be used in any touch screen driver, and the program code of the accidental-touch prevention algorithm is easy to maintain.

Optionally, in another embodiment of the present disclosure, the instruction receiving module 201 is configured to receive a touch instruction from a user by the touch screen IC layer, and report a touch point on a touch track corresponding to the touch instruction to the driver layer.

The processing module 203 is further configured to determine whether the touch point falls within a chamfered-rounded-angle area. If the touch point is in the chamfered-rounded-angle area, the driver layer corrects the coordinates of the touch point.

Specifically, in the present embodiment, the edges of the touch screen of the mobile terminal have a chamfered-rounded-angle area, and the chamfered-rounded-angle area can be located on the left side, the right side, the upper edge, or the lower edge of the touch screen, or the whole edge, or a combination of any of the above.

The present embodiment is a solution to the problem that the touch point at the chamfered-rounded-angle area of the edge of the glass screen does not correspond to the action point (the point displayed on the screen).

The present disclosure corrects the coordinates of the touch point by the touch screen driver layer, makes the touch point in the chamfered-rounded-angle area of the glass screen correspond to the point displayed on the screen one-by-one, and provides the user with better use experience of touch screens.

Optionally, firstly, the touch screen IC layer receives the user's touch instruction, and reports the touch point corresponding to the touch instruction to the driver layer.

Then, the driver layer determines whether the touch point falls within the chamfered-rounded-angle area. If the touch point falls within the chamfered-rounded-angle area, the driver layer corrects the coordinate of the touch point and then reports the corrected coordinate of the touch point. If the touch point is not in the chamfered-rounded-angle area, the driver layer reports the coordinate of the touch point directly.

The process of correcting the coordinate of the touch point by the driver layer includes the followings:

Referring to FIG. 2, the coordinate of the touch point in the chamfered-rounded-angle area of the glass screen (i.e., W1 in the FIG. 2) is corrected.

The correcting of the horizontal coordinate of the touch point is used as an example (the correcting of the vertical ordinate of the touch point is based on similar principle).

Firstly, the driver layer receives the horizontal coordinate of the touch point reported by the touch screen IC layer, and acquires the length of the arc of the chamfered-rounded-angle in the X-axis direction.

Based on a pre-set offset index, the horizontal coordinate of the touch point, and the length of the arc of the chamfered-rounded-angle in the X-axis direction, the actual horizontal coordinate of the touch point is calculated using a predetermined coordinate correction algorithm.

The correction algorithm of coordinate of the present embodiment is as follows:

$$X\_fact = \frac{X\_report - W1 * I}{1 - I};$$

The principle of the coordinate correction algorithm can be derived as follows:

Firstly, from the analysis of a large number of reported touch points, the following two formulas can be given:

$$X\_fact + \text{Offset} = X\_report;$$

$$\text{Offset} = (W1 - X\_fact) * I;$$

Where X_fact is the actual horizontal coordinate of the touch point; X_report is the coordinate reported by the touch screen IC layer; Offset is the offset value; I is the pre-set offset index; W1 is the length of the arc of the chamfered-rounded-angle in the X-axis direction.

From the above two formulas, the correction formula can be reversely derived, as shown below:

$$X\_fact = \frac{X\_report - W1 * I}{1 - I};$$

Thus, according to the pre-set offset index I, the horizontal coordinate of the touch point X_report and the length of the arc of the chamfered-rounded-angle in the X-axis direction W1, by using the above correction formula, the actual horizontal coordinate of the touch point X_fact can be calculated.

It should be noted that, due to the size of the arc edge of the glass, material of glass, and other factors, the offset indices I of different glass screens are not the same, and the offset index I can be calculated through big data.

According to the present embodiment, by determining whether the touch point falls within the chamfered-rounded-angle area of the glass screen, if the touch point falls within the chamfered-rounded-angle area, the coordinate of the touch point can be corrected and the corrected coordinate of the touch point is reported, so as to achieve the accurate positioning of the touch point. This solves the problem that the touch point in the chamfered-rounded-angle area of the edge of the glass screen does not correspond to the action point (the point displayed on the screen), and improves the accidental-touch prevention effect of the mobile terminal, providing a better touch screen experience for the terminal users.

In addition, the embodiment is implemented in the driver layer rather than firmware, which makes the software design of the mobile terminal can get rid of the restrictions of the touch screen IC suppliers, and improves the design flexibility of the accidental-touch-prevention-area function of mobile terminals. The correction algorithm can be used in any touch screen driver, and the program code for coordinate correction is easy to maintain.

The embodiments of the present disclosure also provide a computer storage medium. Executable instructions are stored in the computer storage medium. The executable instructions are for executing at least one of the above-mentioned method for accidental-touch prevention of mobile terminal, such as the method shown in FIG. 1, FIG. 3, FIG. 6, FIG. 7, FIG. 8, or FIG. 10. The computer storage medium in the present embodiments can be CD-ROM, hard disk, disk or other storage media, and can be non-transitory computer readable storage medium.

Figure 15:
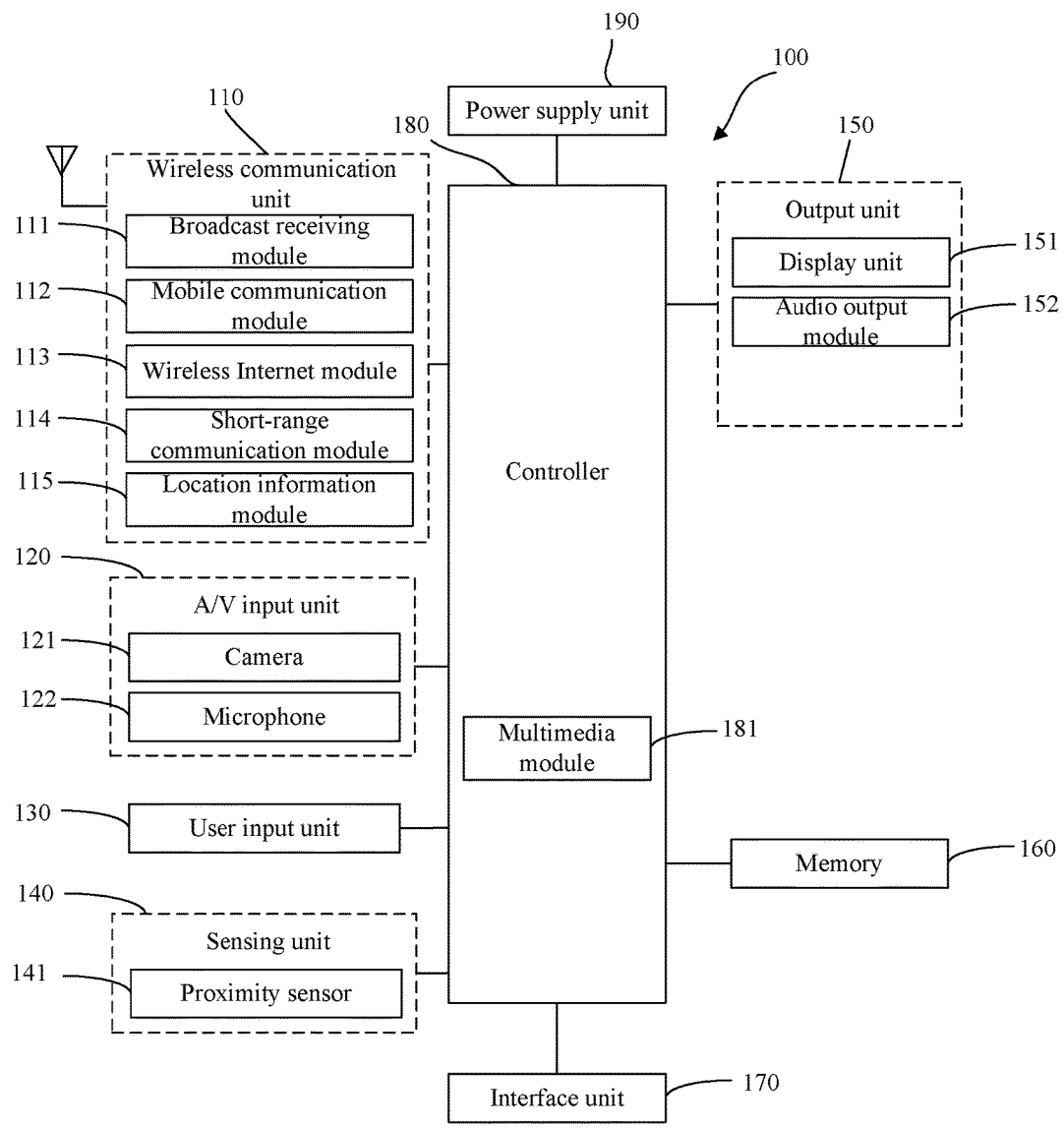
FIG. 15 is a structural diagram of a mobile terminal according to embodiments of the present disclosure.
Figure 16:
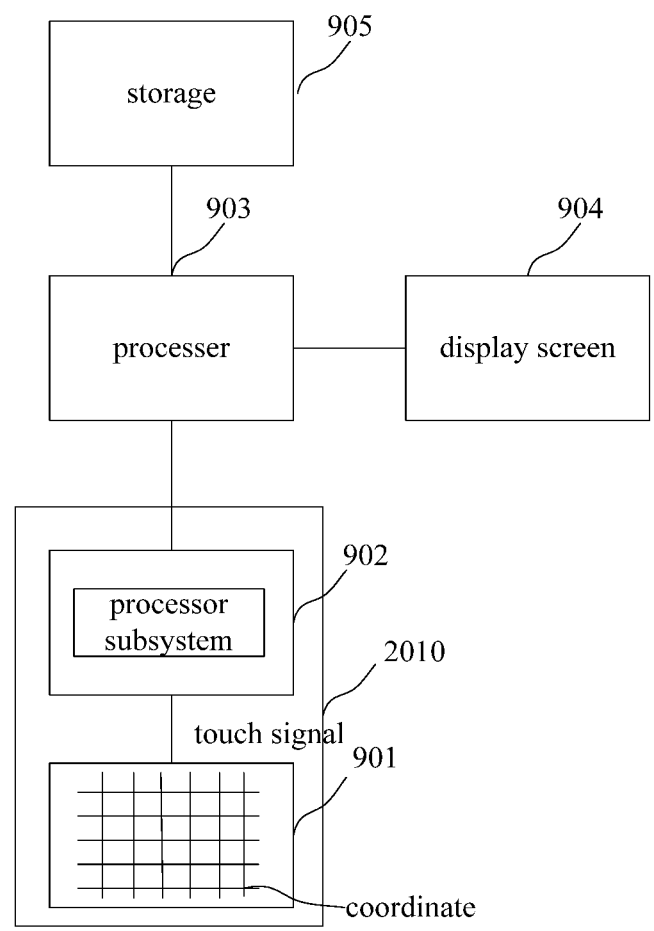
FIG. 16 is a structural diagram of another mobile terminal according to embodiments of the present disclosure.

Referring to FIG. 15 and FIG. 16, there are also provided two mobile terminals capable of applying the above-mentioned accidental-touch prevention methods. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals, such as mobile phones, smart phones, notebook computers, digital broadcast receivers, PDAs (Personal Digital Assistants), PADs (Tablet Computer), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

FIG. 15 is a block diagram of a mobile terminal according to an embodiment of the present invention. As shown in FIG. 15, the mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190 and the like. FIG. 15 shows the mobile terminal as having various components, but it should be understood that implementing all the illustrated components is not a requirement. More or fewer components may optionally be implemented.

The wireless communication unit 110 typically includes one or more components allowing radio communication between the mobile terminal 100 and a wireless communication system or a network. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal. The broadcast associated information may also be provided via a mobile communication network and, in this instance, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like. The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or another type of storage medium).

The mobile communication module 112 transmits and/or receives radio signals to and/or from at least one of a base station (e.g., access point, Node B, etc.), an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique to which this module relates may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location information in real time.

The A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151. The image frames processed by the camera 121 may be stored in the memory 160 (or other storage medium) or transmitted via the wireless communication unit 110. Two or more cameras 121 may be provided according to the configuration of the mobile terminal. The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 during the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted), a jog wheel, a jog switch, and the like. In particular, when the touch pad is overlaid on the display unit 151 in a layered manner, it may form a touch screen.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. The identification module may be a memory chip that stores various information for authenticating a user's authority for using the mobile terminal 100 and may include a user identity module (UIM), a subscriber identity module (SIM), a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals input from the cradle to be transferred to the mobile terminal therethrough. Various command signals or power input from the cradle may be operated as a signal for recognizing that the mobile terminal is accurately mounted on the cradle. The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

The audio output module 152 may convert, and output as sound, audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or the like.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152 by the alarm unit 153.

The memory 160 may store software programs or the like used for the processing and controlling operations performed by the controller 180, or may temporarily store data (e.g., a phonebook, messages, still images, video, etc.) that have been output or which are to be output. Also, the memory 160 may store data regarding various patterns of vibrations and audio signals output when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180. The controller 180 may perform a pattern recognition processing to recognize a handwriting input or a picture drawing input performed on the touch screen as characters or images.

The power supply unit 190 receives external power or internal power and supplies appropriate power required for operating respective elements and components under the control of the controller 180.

Various embodiments as described herein may be implemented in a computer-readable medium using, for example, computer software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180. For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminal, without being limited to the slide-type mobile terminal.

The mobile terminal 100 as shown in FIG. 15 may be configured to operate with a communication system, which transmits data via frames or packets, such as wired and wireless communication systems, as well as satellite-based communication systems.

FIG. 16 provides another embodiment of structure of the mobile terminal. In FIG. 16, the mobile terminal comprising: input device, processor 903 and display screen 904. In one embodiment, the input device is touch screen 2010. The touch screen 2010 comprising a touch panel 901 and a touch controller 902. Besides, the input device can also be untouchable input device (such as infrared input device). The touch panel 901 and the display screen 904 can correspond to the touch screen in the above-mentioned embodiments. The touch IC layer in the touch unit can correspond to the touch panel 901.

The input device can be used to receive the touch instruction of the user by the touch screen IC layer, and report the touch point on the touch track corresponding to the touch instruction to the driver layer. The processor 903 can correspond to the processing module in the above embodiments, which is configured to, when a start point of the touch track falls within the pre-set accidental-touch prevention area, acquire a distance between a touch point behind the start point on the touch track and the start point by the driver layer, and perform accidental-touch prevention processing according to the distance.

The touch controller 902 can be a single Application Specific Integrated Circuit (ASIC), and it can include one or more processor subsystems, the processor subsystem may include one or more ARM processors or other processors with similar functionality and performance.

The touch controller 902 is mainly used for receiving the touch signal generated by the touch panel 901, processing the touch signal and transmitting to the processor 903 of the mobile terminal. The processing comprising, for example, performs analog-to-digital conversion of the physical input signal, processes to achieve the coordinate of the touch point, processes to achieve the duration of touch.

The application layer and the driver layer in the touch control unit can correspond to one or more processor subsystems in the touch controller. That is, the processor subsystem running in the touch controller 902 may correspond to the application layer, the driver layer, and the touch screen IC layer. The operation of the driver layer and the application layer can be performed by the touch controller 902 by running the processor subsystem.

The processor 903 receives the output of the touch controller 902, and performs operations based on the output after processing the output. The operations are not limited to include: moving objects such as table or indicator, scrolling or panning, adjusting control settings, opening files or documents, viewing menus, selecting, executing instructions, operating peripheral devices connected to the host device, answering a call, making a call, stopping a call, changing volume or audio setting, saving information relevant to phone call (such as, address, common number, answered calls, missed calls), logging in to computer or computer network, allowing authorization to access the restricted area of computer or computer network, recording a user profile associated to a user's preferences configuration of a computer desktop, accessing to content on web, starting particular program, encrypting or decoding messages, and so on.

The processor 903 is further connected with the display screen 904. The display screen 904 provides UI for the user of the device.

In one embodiment, the processor 903 can be a component that is separate from the touch controller 902. In other embodiment, the processor 903 can be a component that is combined with the touch controller 902.

In one embodiment, the touch panel 901 is provided with a separate capacitive sensor, a resistive sensor, a force sensor, an optical sensor, or the like.

When user's finger touches the touch panel, the touch panel generates a touch signal (electrical signal) and transmits to the touch controller 902. The touch controller 902 can obtain the coordinates of the touch point by scanning. In one embodiment, the touch panel 901 of touch screen 2010 is physically a set of independent coordinate positioning system, when the coordinate of touch point has been reported to the processor 903, the processor 903 converts the coordinate to the pixel coordinate adapted to the display screen 904, so as to identify the input operation correctly.

In other embodiment, the application layer and the driver layer of the touch control unit can correspond to the processor 903, the processor receives the coordinates of the touch directly, and performs accidental-touch prevention processing.

Such communication systems in which the mobile terminal according to an embodiment of the present invention can operate will now be described with reference to FIG. 17.

These communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 17:
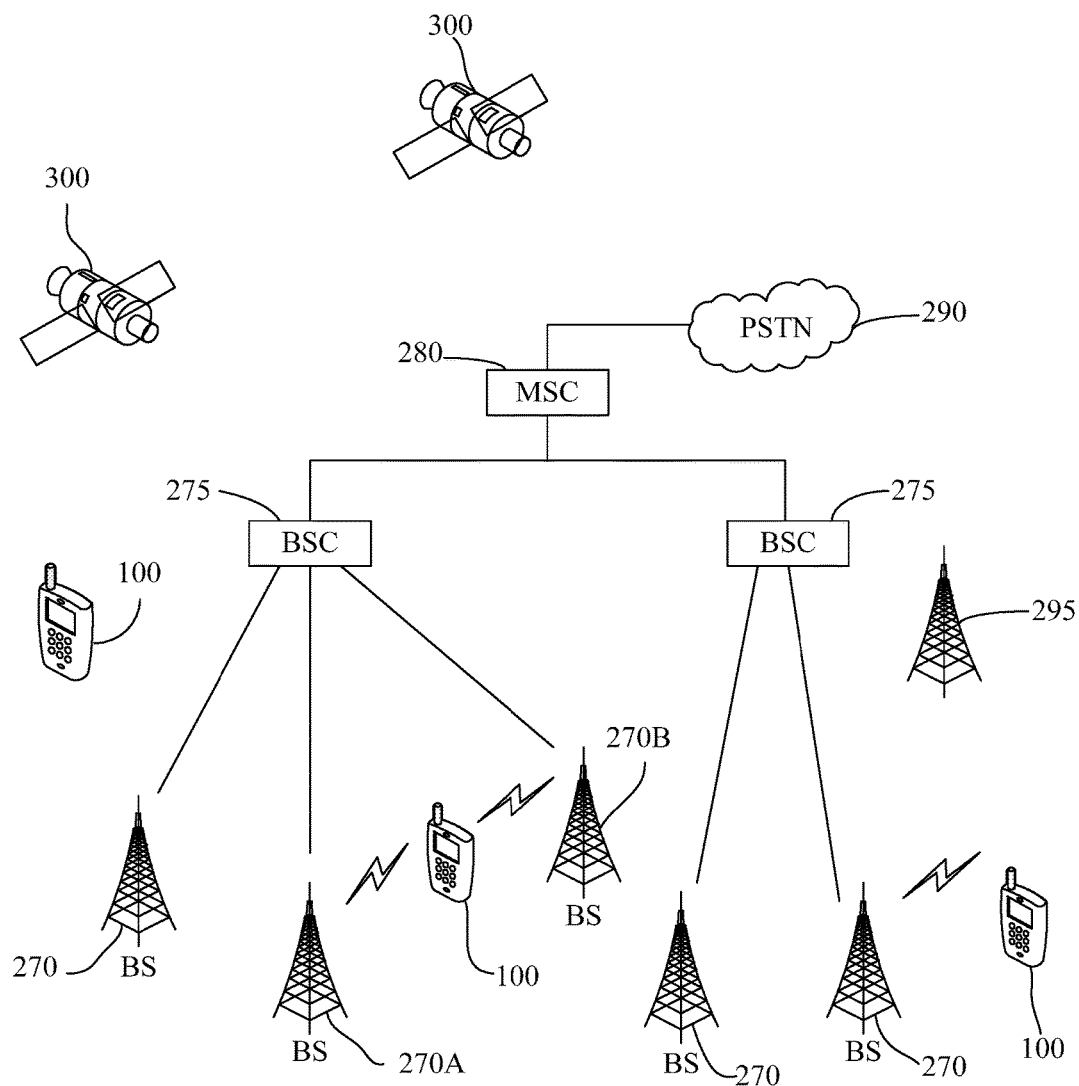
FIG. 17 is a structural diagram of a communication system according to embodiments of the present disclosure.

Referring to FIG. 17, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 17 may include a plurality of BSCs 275.

Each BS 270 may serve one or more sectors (or regions), each sector covered by an omni-directional antenna or an antenna pointed in a particular direction radially away from the BS 270. Optionally, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In this situation, the term "base station" may be used to collectively refer to a single BSC 275 and at least one BS 270. The base station may also be referred to as a "cell site". Optionally, individual sectors of a particular BS 270 may be referred to as a plurality of cell sites.

As shown in FIG. 17, a broadcasting transmitter (BT) 295 transmits a broadcast signal to the mobile terminals 100 operating within the system. The broadcast receiving module 111 as shown in FIG. 15 is provided at the terminal 100 to receive broadcast signals transmitted by the BT 295. In FIG. 17, several global positioning systems (GPS) satellites 300 are shown. The satellites 300 help locate at least one of a plurality of terminals 100.

In FIG. 17, several satellites 300 are depicted, but it is understood that useful positioning information may be obtained with any number of satellites. The GPS module 115 as shown in FIG. 15 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engage in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

It should be noted that features of the various above-described embodiments can be implemented in combination with each other.

It should be noted that in the present disclosure, the terms 'comprising', 'including' or any other variant which is intended to encompass a non-exclusive inclusion, so as to include a series of elements of process, method, material or apparatus, and not only include those elements, but also include other elements that are not explicitly listed, or the elements that are inherent to these process, method, material or apparatus. In the absence of more restrictions, the elements defined by the statement 'comprising a . . . ' do not exclude the presence of the other same elements in the process, method, material or apparatus that includes the elements.

The above described embodiments of the present disclosure are only for the sake of description and do not represent the pros and cons of the embodiments.

With the description of the above embodiments, it will be apparent to those skilled in the art that the method of the above embodiments can be realized by software plus the necessary general hardware platform, and also can be realized by the hardware, but in many cases the former is a better embodiment. Based on this understanding, the technical solution of the present disclosure, in essence, or in the form of a prior art, can be embodied in the form of a software product, the software product stored in a storage medium (such as ROM/RAM, disk, CD-ROM), and the software product includes a number of instructions for enabling a terminal device (which may be a mobile phone, a computer, a server, or a network device, etc.) to perform the method described in the various embodiments of the present disclosure.

For the purpose of explanation, the above description uses specific terms to provide a thorough understanding of the present disclosure. It will be apparent, however, to one skilled in the art that specific details are not required to practice the disclosure. The foregoing description of specific embodiments of the present disclosure has been presented for the purpose of illustration. They are not intended to be exhaustive or to limit the invention to the precise form disclosed. In view of the above doctrines, many modifications and variations are possible. These embodiments are shown and described in order to best explain the principles of the present disclosure and its practical application so that other technicians skilled in the art will be able to make good use of the present disclosure and various modifications that are suitable for the intended use various embodiments. It is intended that the scope of the disclosure be defined by the following claims and their equivalents.

What is claimed is:

1. An accidental-touch prevention method for a mobile terminal, wherein the mobile terminal includes a touch control unit having an application layer, a driver layer and a touch screen IC layer, the driver layer has an interface for the application layer to call, and a touch screen has a chamfered-rounded-angle area, the accidental-touch prevention method comprising:
receiving, by the touch screen IC layer, a touch instruction from a user, and reporting a touch point on a touch track corresponding to the touch instruction to the driver layer;
determining, by the driver layer, whether the touch point is in the chamfered-rounded-angle area; and
when the touch point is in the chamfered-rounded-angle area, correcting, by the driver layer, coordinates of the touch point, wherein correcting the coordinates of the touch point includes:
receiving, by the driver layer, a horizontal coordinate of the touch point reported by the touch screen IC layer, and acquiring a length of an arc of the chamfered-rounded-angle in an X-axis direction; and
based on a pre-set offset index, the horizontal coordinate of the touch point, and the length of the arc of the chamfered-rounded-angle in the X-axis direction, calculating an actual horizontal coordinate of the touch point.

2. The method according to claim 1, further comprising:
reporting, by the driver layer, to the application layer the touch point with the corrected coordinates.

3. The method according to claim 1, after determining, by the driver layer, whether the touch point falls within a chamfered-rounded-angle area, further comprising:
when the touch point is not in the chamfered-rounded-angle area, reporting, by the driver layer, the coordinates of the touch point to the application layer.

4. The method according to claim 1, wherein the chamfered-rounded-angle area is located on a left side, a right side, an upper edge, a lower edge of the touch screen, a whole edge, or a combination thereof.

5. The method according to claim 1, further comprising:
determining the pre-set offset index by analyzing a pre-set number of reported touch points.

6. The method according to claim 5, wherein determining the pre-set offset index comprises:
calculating the pre-set offset index using the following formula:

$$X\_fact + \text{Offset} = X\_report; \text{ and}$$

$$\text{Offset} = (W1 - X\_fact) * I;$$

wherein X_fact is the actual horizontal coordinate of the touch point; X_report is a coordinate reported by the touch screen IC layer; Offset is an offset value; I is the pre-set offset index; W1 is the length of the arc of the chamfered-rounded-angle in the X-axis direction.

7. The method according to claim 1, further comprising:
receiving, by the application layer, an accidental-touch-prevention-area configuration instruction, the accidental-touch-prevention-area configuration instruction including coordinate parameters of the accidental-touch prevention area;

based on the accidental-touch-prevention-area configuration instruction, calling, by the application layer, the interface of the driver layer to set up one or more accidental-touch prevention areas on the touch screen of the mobile terminal.

8. The method according to claim 7, further comprising:
receiving, by the touch screen IC layer, the touch instruction from the user, and reporting touch point information corresponding to the touch instruction to the driver layer;

determining, by the driver layer, whether the touch point according to the touch point information falls within the accidental-touch prevention area; performing, by the driver layer, an accidental-touch prevention processing on the touch point when the touch point according to the touch point information falls within the accidental-touch prevention area; otherwise, reporting, by the driver layer, the touch point information to the application layer, and responding, by the application layer, to the touch point.

9. The method according to claim 8, wherein determining, by the driver layer, whether the touch point according to the touch point information falls within the accidental-touch prevention area; and performing, by the driver layer, the accidental-touch prevention processing on the touch point when the touch point according to the touch point information falls within the accidental-touch prevention area, further comprise:

determining, by the driver layer, whether a start point of the touch track falls within the pre-set accidental-touch prevention area, and performing the accidental-touch prevention processing according to determining result.

10. An accidental-touch-prevention apparatus for a mobile terminal, wherein the mobile terminal includes a touch control unit having an application layer, a driver layer and a touch screen IC layer, and a driver layer has an interface for the application layer to call, the touch screen has a chamfered-rounded-angle area, the accidental-touch-prevention apparatus comprising:

an instruction receiving module configured to receive a touch instruction from a user by the touch screen IC layer, and to report a touch point on a touch track corresponding to the touch instruction to the driver layer; and a processing module configured to determine whether the touch point is in the chamfered-rounded-angle area by the driver layer; and when the touch point is in the chamfered-rounded-angle area, correct coordinates of the touch point by the driver layer, wherein the processing module is configured to:
receive a horizontal coordinate of the touch point by the driver layer reported by the touch screen IC layer, and acquire a length of an arc of the chamfered-rounded-angle in the X-axis direction; and based on a pre-set offset index, the horizontal coordinate of the touch point, and the length of the arc of the chamfered-rounded-angle in the X-axis direction, calculate an actual horizontal coordinate of the touch point.

11. The apparatus according to claim 10, wherein the processing module is configured to:
report to the application layer the touch point with the corrected coordinates by the driver layer.

12. The apparatus according to claim 10, wherein the processing module is configured to:
when the touch point is not in the chamfered-rounded-angle area, report the coordinates of the touch point by the driver layer to the application layer.

13. The apparatus according to claim 10, wherein the chamfered-rounded-angle area is located on a left side, a right side, an upper edge, a lower edge of the touch screen, a whole edge, or a combination thereof.

14. The apparatus according to claim 10, wherein the processing module is configured to:
determine the pre-set offset index and analyze a pre-set number of reported touch points.

15. The apparatus according to claim 14, wherein the processing module is configured to:
calculate the pre-set offset index using the following formula:

$$X\_{fact}+\text{Offset}=X\_{report}; \text{ and}$$

$$\text{Offset}=(W1-X\_{fact})*I;$$

wherein X_fact is the actual horizontal coordinate of the touch point; X_report is a coordinate reported by the touch screen IC layer; Offset is an offset value; I is the pre-set offset index; W1 is the length of the arc of the chamfered-rounded-angle in the X-axis direction.

16. The apparatus according to claim 10, wherein the instruction receiving module is configured to receive an accidental-touch-prevention-area configuration instruction by the application layer, the accidental-touch-prevention-area configuration instruction including coordinate parameters of the accidental-touch prevention area;

the processing module is configured to call the interface of the driver layer by the application layer to set up the one or more accidental-touch prevention areas on the touch screen of the mobile terminal based on accidental-touch-prevention-area configuration instruction.

17. The apparatus according to claim 16, wherein the instruction receiving module is configured to receive the touch instruction from the user by the touch screen IC layer, and report the touch point information corresponding to the touch instruction to the driver layer;

the processing module is configured to determine whether the touch point according to the touch point information falls within the accidental-touch prevention area by the driver layer; perform an accidental-touch prevention processing by the driver layer on the touch point when the touch point according to the touch point information falls within the accidental-touch prevention area; otherwise, report the touch point information by the driver layer to the application layer, and respond to the touch point by the application layer.

18. The apparatus according to claim 17, wherein the processing module is configured to:
determine whether a start point of the touch track falls within the pre-set accidental-touch prevention area by the driver layer, and perform the accidental-touch prevention processing according to the determining result.

* * * * *